(12) United States Patent
Noguchi et al.

(10) Patent No.: US 8,966,215 B2
(45) Date of Patent: Feb. 24, 2015

(54) INFORMATION PROCESSING SYSTEM

(71) Applicant: Fujitsu Limited, Kawasaki-shi (JP)

(72) Inventors: Yasuo Noguchi, Kawasaki (JP);
Toshihiro Ozawa, Yokohama (JP);
Kazuichi Oe, Yokohama (JP); Munenori Maeda, Yokohama (JP); Kazutaka Ogihara, Hachioji (JP); Masahisa Tamura, Kawasaki (JP); Ken Iizawa, Yokohama (JP); Tatsuo Kumano, Kawasaki (JP); Jun Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 212 days.

(21) Appl. No.: 13/766,816

(22) Filed: Feb. 14, 2013

(65) Prior Publication Data

US 2013/0246717 A1     Sep. 19, 2013

(30) Foreign Application Priority Data

Mar. 19, 2012   (JP) ................................ 2012-062300

(51) Int. Cl.
*G06F 13/00* (2006.01)
*G06F 3/06* (2006.01)

(52) U.S. Cl.
CPC .............. *G06F 3/067* (2013.01); *G06F 3/0614* (2013.01); *G06F 3/0635* (2013.01)
USPC ............... 711/170; 711/148; 710/37; 710/38; 710/316

(58) Field of Classification Search
None
See application file for complete search history.

(56) References Cited

U.S. PATENT DOCUMENTS

| 7,702,796 | B2* | 4/2010 | Shen et al. ..................... 709/227 |
| 7,774,570 | B2 | 8/2010 | Kinoshita et al. |
| 2006/0047907 | A1* | 3/2006 | Shiga et al. .................... 711/114 |
| 2007/0033366 | A1* | 2/2007 | Eisenhauer et al. .......... 711/170 |
| 2012/0278584 | A1* | 11/2012 | Nagami et al. ................ 711/170 |

FOREIGN PATENT DOCUMENTS

| JP | 6-282519 | 10/1994 |
| JP | 2008-112303 | 5/2008 |

* cited by examiner

*Primary Examiner* — Aimee Li
*Assistant Examiner* — Jason Blust
(74) *Attorney, Agent, or Firm* — Fujitsu Patent Center

(57) ABSTRACT

An information processing system includes: CPUs; storage devices; switches; dummy storage devices which are with respective storage devices and each of which sends, when receiving an identifying information request, its own identifying information back to a sender of the identifying information request; and dummy CPUs which are associated with respective CPUs and each of which tries to, when receiving an instruction for acquiring identifying information from a dummy storage device, acquire the identifying information of the dummy storage device by transmitting the identifying information request, and sends the identifying information as response information back to a sender device of the acquiring instruction.

6 Claims, 20 Drawing Sheets

FIG. 4

| DEVICE ID | EXP ID | PORT ID | ZONE |
|---|---|---|---|
| CPU-A | EXP-A | 0 | NULL |
| DUMMY CPU-A | EXP-A | 1 | NULL |
| EXP-M | EXP-A | 2 | NULL |
| CPU-B | EXP-B | 0 | NULL |
| DUMMY CPU-C | EXP-B | 1 | NULL |
| EXP-M | EXP-B | 2 | NULL |
| CPU-C | EXP-C | 0 | NULL |
| DUMMY CPU-C | EXP-C | 1 | NULL |
| EXP-M | EXP-C | 2 | NULL |
| HDD-A | EXP-D | 0 | NULL |
| DUMMY HDD-A | EXP-D | 1 | NULL |
| EXP-M | EXP-D | 2 | NULL |
| HDD-B | EXP-E | 0 | NULL |
| DUMMY HDD-B | EXP-E | 1 | NULL |
| EXP-M | EXP-E | 2 | NULL |
| HDD-C | EXP-F | 0 | NULL |
| DUMMY HDD-C | EXP-F | 1 | NULL |
| EXP-M | EXP-F | 2 | NULL |
| EXP-A | EXP-M | 0 | NULL |
| EXP-B | EXP-M | 1 | NULL |
| EXP-C | EXP-M | 2 | NULL |
| EXP-D | EXP-M | 3 | NULL |
| EXP-E | EXP-M | 4 | NULL |
| EXP-F | EXP-M | 5 | NULL |

| USER ID | ZONE |
|---|---|
| NULL | NULL |

42

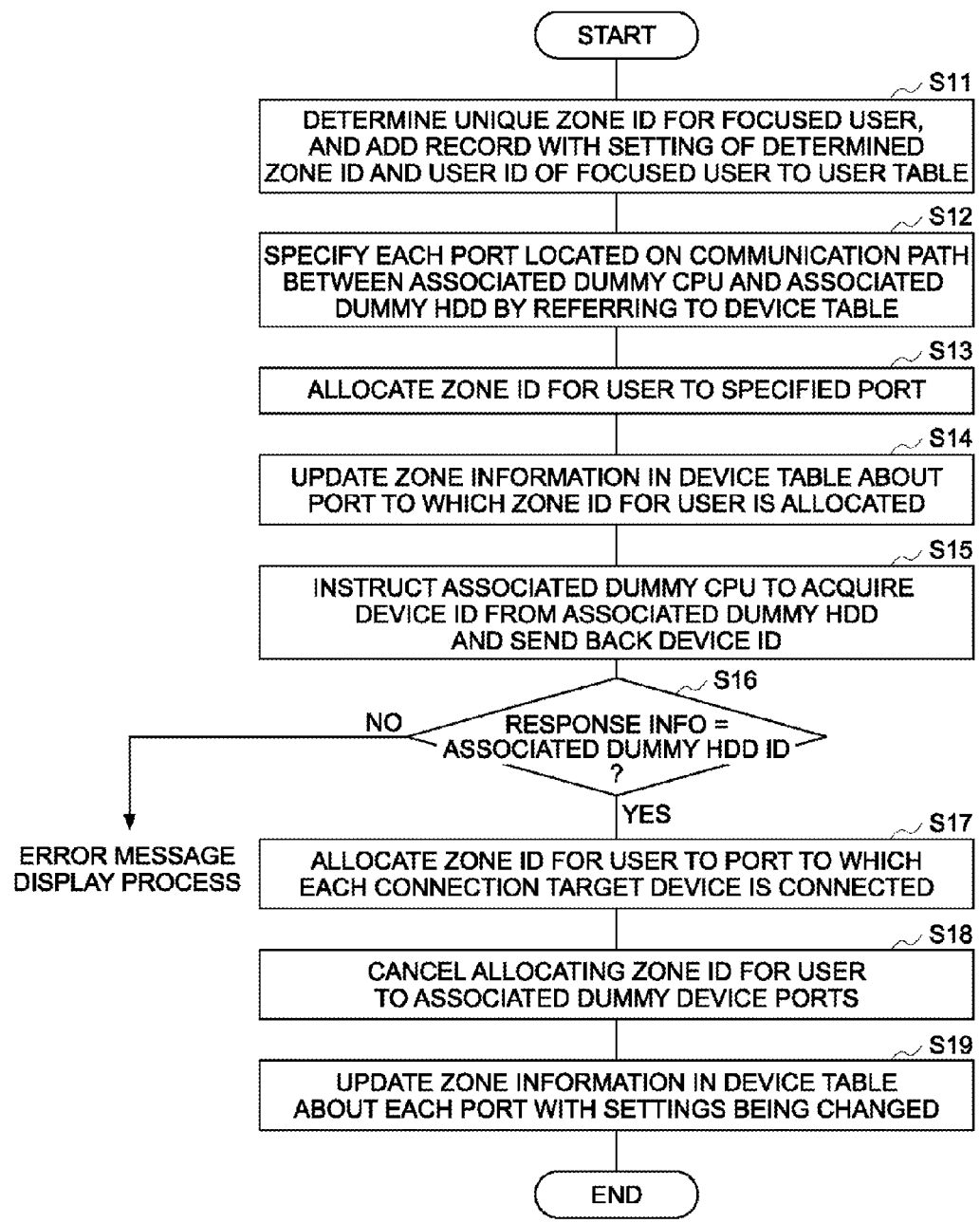

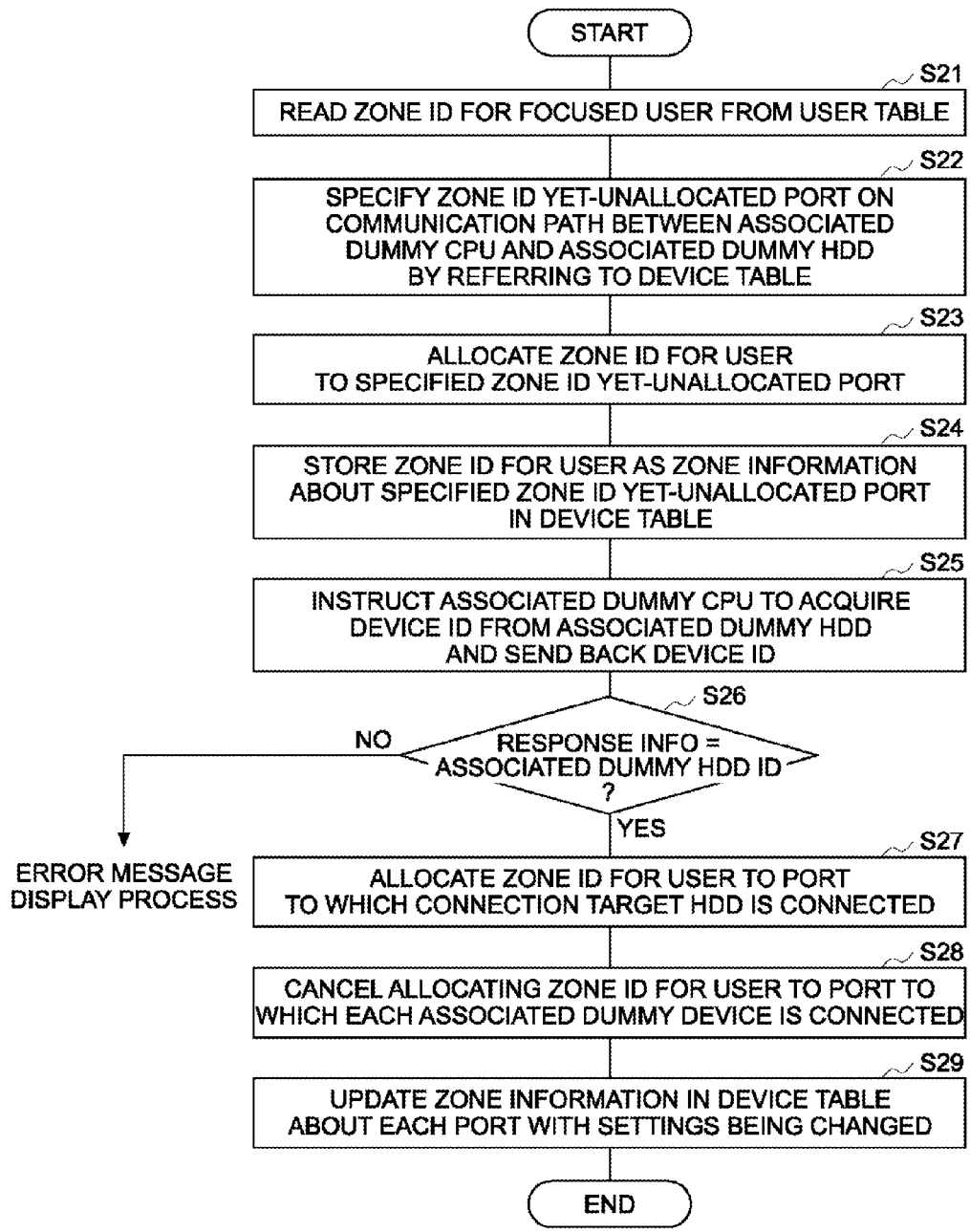

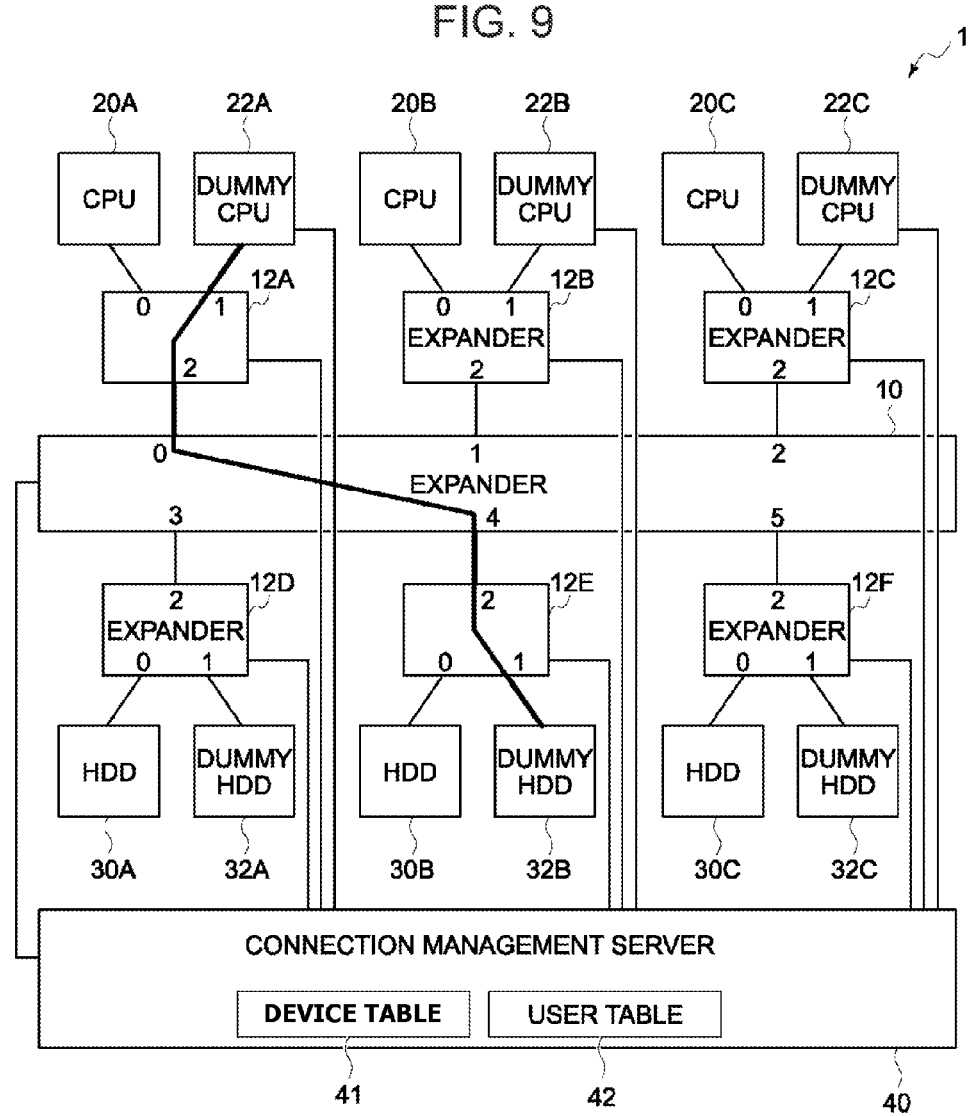

FIG. 10

| DEVICE ID | EXP ID | PORT ID | ZONE |
|---|---|---|---|
| CPU-A | EXP-A | 0 | NULL |
| DUMMY CPU-A | EXP-A | 1 | 1 |
| EXP-M | EXP-A | 2 | 1 |
| CPU-B | EXP-B | 0 | NULL |
| DUMMY CPU-C | EXP-B | 1 | NULL |
| EXP-M | EXP-B | 2 | NULL |
| CPU-C | EXP-C | 0 | NULL |
| DUMMY CPU-C | EXP-C | 1 | NULL |
| EXP-M | EXP-C | 2 | NULL |
| HDD-A | EXP-D | 0 | NULL |
| DUMMY HDD-A | EXP-D | 1 | NULL |
| EXP-M | EXP-D | 2 | NULL |
| HDD-B | EXP-E | 0 | NULL |
| DUMMY HDD-B | EXP-E | 1 | 1 |
| EXP-M | EXP-E | 2 | 1 |
| HDD-C | EXP-F | 0 | NULL |
| DUMMY HDD-C | EXP-F | 1 | NULL |
| EXP-M | EXP-F | 2 | NULL |
| EXP-A | EXP-M | 0 | 1 |
| EXP-B | EXP-M | 1 | NULL |
| EXP-C | EXP-M | 2 | NULL |
| EXP-D | EXP-M | 3 | NULL |
| EXP-E | EXP-M | 4 | 1 |
| EXP-F | EXP-M | 5 | NULL |

| DEVICE ID | EXP ID | PORT ID | ZONE |
|---|---|---|---|
| CPU-A | EXP-A | 0 | 1 |
| DUMMY CPU-A | EXP-A | 1 | NULL |
| EXP-M | EXP-A | 2 | 1 |
| CPU-B | EXP-B | 0 | NULL |
| DUMMY CPU-C | EXP-B | 1 | NULL |
| EXP-M | EXP-B | 2 | NULL |
| CPU-C | EXP-C | 0 | NULL |
| DUMMY CPU-C | EXP-C | 1 | NULL |
| EXP-M | EXP-C | 2 | NULL |
| HDD-A | EXP-D | 0 | NULL |
| DUMMY HDD-A | EXP-D | 1 | NULL |
| EXP-M | EXP-D | 2 | NULL |
| HDD-B | EXP-E | 0 | 1 |
| DUMMY HDD-B | EXP-E | 1 | NULL |
| EXP-M | EXP-E | 2 | 1 |
| HDD-C | EXP-F | 0 | NULL |
| DUMMY HDD-C | EXP-F | 1 | NULL |
| EXP-M | EXP-F | 2 | NULL |
| EXP-A | EXP-M | 0 | 1 |
| EXP-B | EXP-M | 1 | NULL |
| EXP-C | EXP-M | 2 | NULL |
| EXP-D | EXP-M | 3 | NULL |
| EXP-E | EXP-M | 4 | 1 |
| EXP-F | EXP-M | 5 | NULL |

FIG. 15

| DEVICE ID | EXP ID | PORT ID | ZONE |
|---|---|---|---|
| CPU-A | EXP-A | 0 | 1 |
| DUMMY CPU-A | EXP-A | 1 | 1 |
| EXP-M | EXP-A | 2 | 1 |
| CPU-B | EXP-B | 0 | NULL |
| DUMMY CPU-C | EXP-B | 1 | NULL |
| EXP-M | EXP-B | 2 | NULL |
| CPU-C | EXP-C | 0 | NULL |
| DUMMY CPU-C | EXP-C | 1 | NULL |
| EXP-M | EXP-C | 2 | NULL |
| HDD-A | EXP-D | 0 | NULL |
| DUMMY HDD-A | EXP-D | 1 | 1 |
| EXP-M | EXP-D | 2 | 1 |
| HDD-B | EXP-E | 0 | NULL |
| DUMMY HDD-B | EXP-E | 1 | 1 |
| EXP-M | EXP-E | 2 | 1 |
| HDD-C | EXP-F | 0 | NULL |
| DUMMY HDD-C | EXP-F | 1 | NULL |
| EXP-M | EXP-F | 2 | NULL |
| EXP-A | EXP-M | 0 | 1 |
| EXP-B | EXP-M | 1 | NULL |
| EXP-C | EXP-M | 2 | NULL |
| EXP-D | EXP-M | 3 | 1 |
| EXP-E | EXP-M | 4 | 1 |
| EXP-F | EXP-M | 5 | NULL |

| DEVICE ID | EXP ID | PORT ID | ZONE |
|---|---|---|---|
| CPU-A | EXP-A | 0 | 1 |
| DUMMY CPU-A | EXP-A | 1 | NULL |
| EXP-M | EXP-A | 2 | 1 |
| CPU-B | EXP-B | 0 | NULL |
| DUMMY CPU-C | EXP-B | 1 | NULL |
| EXP-M | EXP-B | 2 | NULL |
| CPU-C | EXP-C | 0 | NULL |
| DUMMY CPU-C | EXP-C | 1 | NULL |
| EXP-M | EXP-C | 2 | NULL |
| HDD-A | EXP-D | 0 | NULL |
| DUMMY HDD-A | EXP-D | 1 | 1 |
| EXP-M | EXP-D | 2 | 1 |
| HDD-B | EXP-E | 0 | 1 |
| DUMMY HDD-B | EXP-E | 1 | NULL |
| EXP-M | EXP-E | 2 | 1 |
| HDD-C | EXP-F | 0 | NULL |
| DUMMY HDD-C | EXP-F | 1 | NULL |
| EXP-M | EXP-F | 2 | NULL |
| EXP-A | EXP-M | 0 | 1 |
| EXP-B | EXP-M | 1 | NULL |
| EXP-C | EXP-M | 2 | NULL |
| EXP-D | EXP-M | 3 | 1 |
| EXP-E | EXP-M | 4 | 1 |
| EXP-F | EXP-M | 5 | NULL |

FIG. 19

| DEVICE ID | EXP ID | PORT ID | ZONE |
|---|---|---|---|
| CPU-A | EXP-A | 0 | NULL |
| DUMMY CPU-A | EXP-A | 1 | NULL |
| EXP-M | EXP-A | 2 | NULL |
| CPU-B | EXP-B | 0 | NULL |
| DUMMY CPU-C | EXP-B | 1 | NULL |
| EXP-M | EXP-B | 2 | NULL |
| CPU-C | EXP-C | 0 | NULL |
| DUMMY CPU-C | EXP-C | 1 | NULL |
| EXP-M | EXP-C | 2 | NULL |
| EXP-A | EXP-M | 0 | NULL |
| EXP-B | EXP-M | 1 | NULL |
| EXP-C | EXP-M | 2 | NULL |
| HDD-A | EXP-M | 3 | NULL |
| HDD-B | EXP-M | 4 | NULL |
| HDD-C | EXP-M | 5 | NULL |

51

INFORMATION PROCESSING SYSTEM

CROSS-REFERENCE TO RELATED APPLICATIONS

This application is based upon and claims the benefit of priority of the prior Japanese Patent Application No. 2012-062300, filed on Mar. 19, 2012, the entire contents of which are incorporated herein by reference.

FIELD

The present invention relates to an information processing system including a plurality of CPUs (Central Processing Units) and a plurality of storage devices.

BACKGROUND

An information processing system having a configuration illustrated in FIG. 1 is known as a system including a plurality of CPUs. This information processing system is a system enabling each of CPUs 60X (X=A–C) to use one or more arbitrary HDDs (Hard Disk Drives) 70 (70A-70C).

To be specific, an expander 65 in the information processing system is a switch including a plurality of ports and capable of being specified a connecting relation between these ports from outside. Further, in the case of getting the CPU 60A to use an HDD 70A, a connection management server 75 allocates, as illustrated in FIG. 2A, a certain zone ID ("1" in "ZONE 1") to a port of the expander 65 to which the CPU 60A is connected and a port thereof to which the HDD 70A is connected, thereby establishing a connection between the CPU 60A and the HDD 70A. In the case of getting the CPU 60A to use also an HDD 70B, the connection management server 75 allocates, as illustrated in FIG. 2B, the same zone ID to a port of the expander 65 to which the HDD 70B is connected, thereby establishing a connection between the CPU 60A and the HDD 70B.

Further, the connection management server 75 allocates, in the case of getting a CPU 60B to use an HDD 70C, as illustrated in FIG. 2C, another zone ID to a port of the expander 65 to which the CPU 60B is connected and a port thereof to which the HDD 70C is connected, thereby establishing a connection between the CPU 60B and the HDD 70C.

PRIOR ART DOCUMENTS

Patent document 1: Japanese Patent Laid-Open No. 06-282519

Patent document 2: Japanese Patent Laid-Open No. 2008-112303

As described above, in the conventional information processing system (FIGS. 1 and 2A-2C), the connection management server 75 controls the connecting relation between the CPUs 60 and the HDDs 70. The controls of the connecting relation between the CPUs 60 and the HDDs 70 by the connection management server 75 are usually carried out with no problem, however, such a case exists that a different combination of devices from what is intended are connected due to a bug of a program in the connection management server 75. Moreover, there is also a case where a different combination of the devices from what is intended are connected due to an error of settings with respect to the connection management server 75.

Further, in the information processing system having the configuration described above, when an HDD 70 is connected to a certain CPU 60, this CPU 60 is the only CPU capable of grasping the HDD 70. Namely, the connection management server 75 has none of a technique for knowing which CPU 60 and which HDD 70 are actually connected as a result of performing the control over the expander 65. Therefore, in the conventional information processing system, a system administrator does not get aware of conducting an erroneous connection till receiving notification given from a user of each CPU 60.

It is considered for preventing such a problem from arising to check immediately after connecting a certain CPU 60 to a certain HDD 70 whether the valid HDD 70 is connected or not by utilizing this CPU 60. The system administrator can utilize the CPU 60 enabled to be used by the user, which implies, however, that the system administrator can read information stored in the HDD 70 by the user. Accordingly, it is not preferable to utilize the CPUs within the system in order to prevent the problem described above from arising.

SUMMARY

According to an aspect of the embodiments, an information processing system includes: first through N-th (N≥2) central processing units (CPUs); first through N-th dummy CPUs associated respectively with the first through N-th CPUs; first through M-th (M≥2) storage devices; first through M-th dummy storage devices associated respectively with the first through M-th storage devices; a main switch including at least (N+M) number of ports; first through N-th dedicated CPU switches associated respectively with the first through N-th CPUs, each of the first through N-th dedicated CPU switches having a port group including at least three ports; and first through M-th dedicated storage device switches associated respectively with the first through M-th storage devices, each of the first through M-th dedicated storage device switches having a port group including at least three ports. Moreover, the port group of each dedicated CPU switch among the first through M-th dedicated CPU switches is connected to a CPU among the first through N-th CPUs which is associated with the each dedicated storage switch, to a dummy CPU among the first through N-th dummy CPUs which is associated with the CPU, and to one port of the main switch, the port group of each dedicated storage device switch among the first through M-th dedicated storage device switches is connected to a storage device among the first through M-th storage devices which is associated with the each dedicated storage device switch, to a dummy storage device among the first through M-th dummy storage devices associated with the storage device, and to one port of the main switch, each of the first through M-th dummy devices is a device that sends, when receiving an identifying information request, its own identifying information back to a sender of the identifying information request, and each of the first through N-th dummy CPUs is a device that tries to, when receiving an instruction of acquiring identifying information from a dummy storage device among the first through M-th storage devices, acquire the identifying information of the dummy storage device by transmitting the identifying information request, and sends the identifying information as response information back to a sender device of the acquiring instruction.

According to another aspect of the embodiments, an information processing system includes: first through N-th (N≥2) CPUs; first through N-th dummy CPUs associated respectively with the first through N-th CPUs; first through M-th (M≥2) storage devices; a main switch including at least (N+M) number of ports; and first through N-th dedicated CPU switches associated respectively with the first through N-th CPUs, each of the first through N-th dedicated CPU switches having a port group including at least three ports, wherein the port group of each dedicated CPU switch among the first through N-th dedicated CPU switches is connected to a CPU among the first through N-th CPUs which is associated with the each dedicated storage switch, to a dummy CPU among the first through N-th dummy CPUs which is associated with the CPU, and to one port of the main switch, the first through M-th storage devices are connected to ports, different from each other, of the main switch, to which the dedicated CPU switches are not connected, and each of the first through N-th dummy CPUs is a device that, when receiving an instruction acquiring identifying information from a certain storage device among first through M-th storage devices, tries to acquire the identifying information of the storage device, and sends the identifying information as response information back to a sender device of the acquiring instruction if the identifying information can be acquired.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 4 is an explanatory diagram of a device table included in the information processing system according to the first embodiment;

FIG. 5 is an explanatory diagram of a user table included in the information processing system according to the first embodiment;

FIG. 6 is a flowchart illustrating of a validation connecting process for a new user, which is executed by a connection management server of the information processing system according to the first embodiment;

FIG. 7 is a flowchart illustrating of a validation connecting process for an existing user, which is executed by the connection management server of the information processing system according to the first embodiment;

FIG. 8 is an explanatory diagram of an example of an update result of a user table in the validation connecting process for a new user;

FIG. 9 is an explanatory diagram of an example of a status of an information processing system 1 during the validation connecting process for a new user;

FIG. 10 is an explanatory diagram of an example of contents of a device table during the validation connecting process for a new user;

FIG. 13 is an explanatory diagram of an example of the contents of the device table when completing the validation connecting process for a new user;

FIG. 15 is an explanatory diagram of an example of the contents of the device table during the validation connecting process for an existing user;

FIG. 17 is an explanatory diagram of an example of the contents of the device table when completing the validation connecting process for an existing user;

FIG. 19 is an explanatory diagram of the device table included in the information processing system according to the second embodiment;

DESCRIPTION OF EMBODIMENTS

In-depth descriptions of some embodiments of the present invention will hereinafter be made with reference to the drawings. Configurations of the respective embodiments, which will hereinafter be described, are nothing more than exemplifications of the present invention, and the present invention is not limited to the configurations of the respective embodiments.

<<First Embodiment>>

To start with, an outline (which is mainly a hardware configuration) of an information processing system 1 according to a first embodiment will be described by use of FIG. 3.

Figure 1:
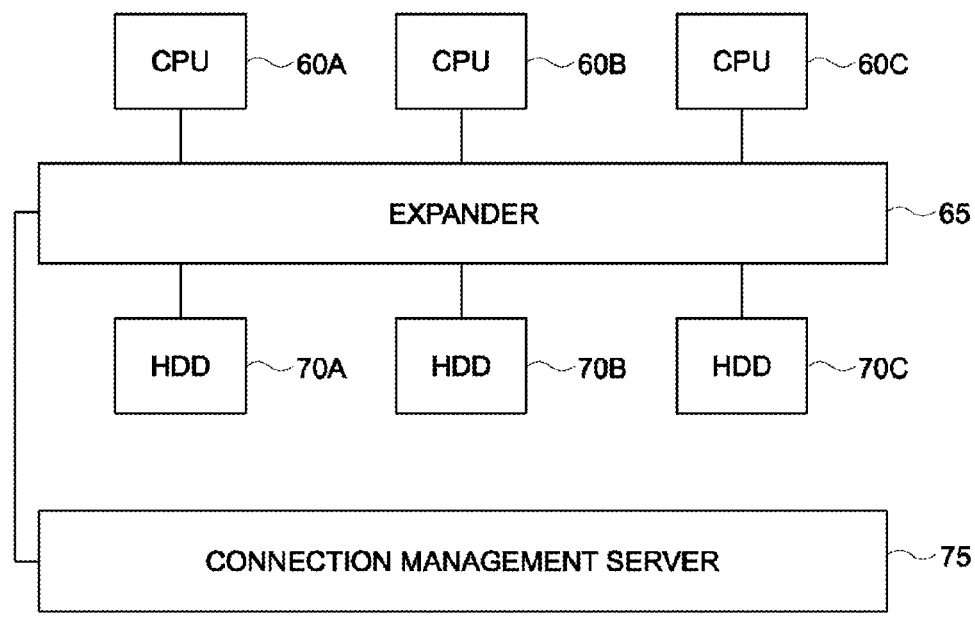
FIG. 1 is a diagram of a configuration of a conventional information processing system.
Figure 2A:
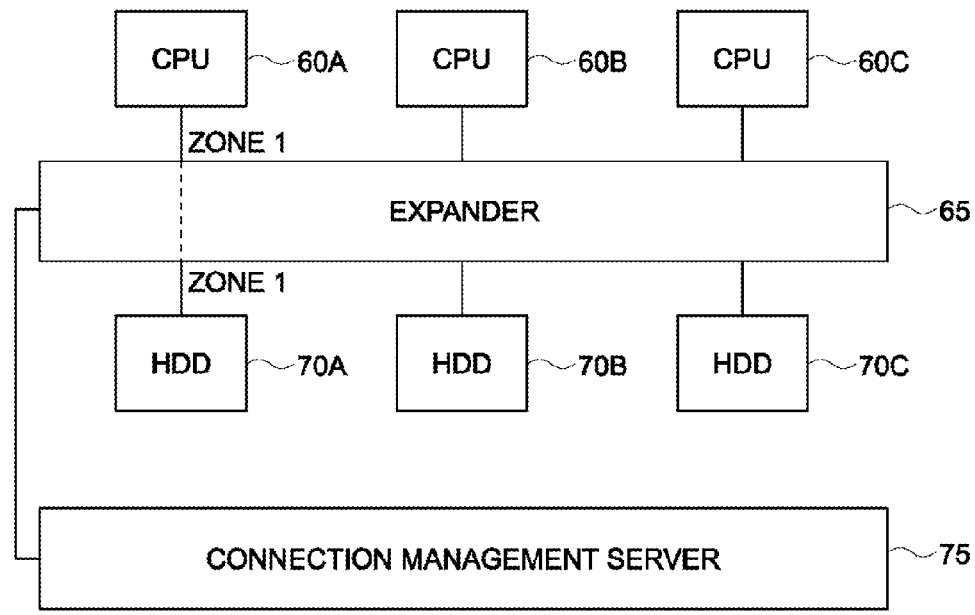
FIG. 2A is an explanatory diagram (part 1) of contents of control by a connection management server of the conventional information processing system.
Figure 2B:
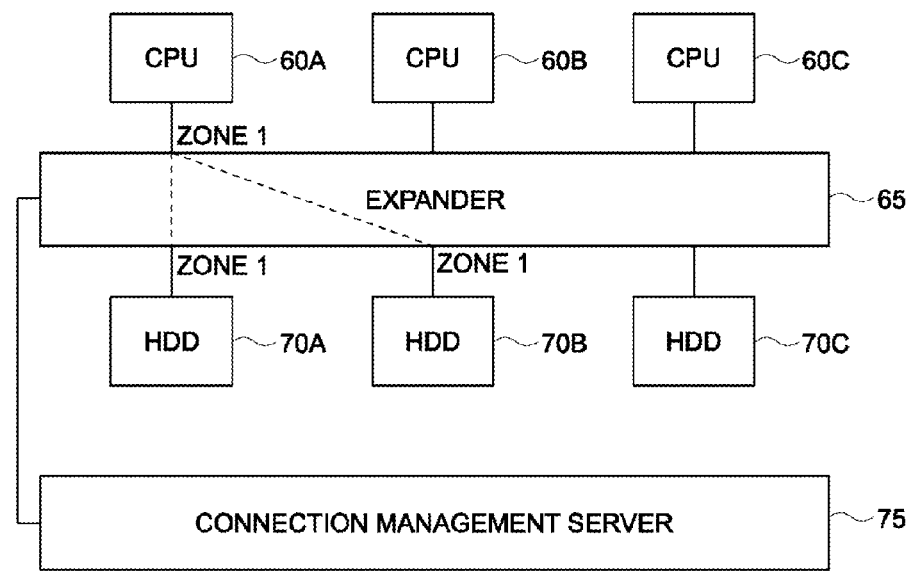
FIG. 2B is an explanatory diagram (part 2) of the contents of the control by the connection management server of the conventional information processing system.
Figure 2C:
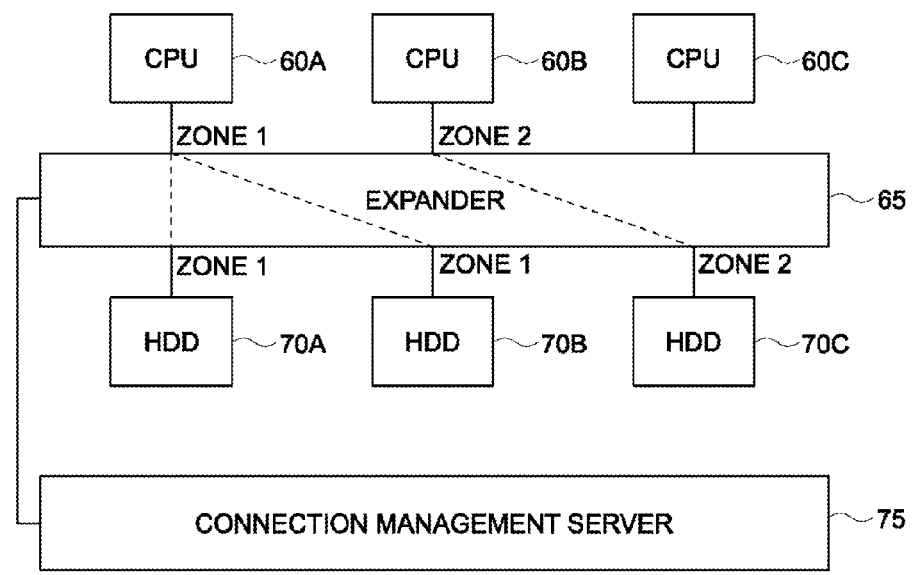
FIG. 2C is an explanatory diagram (part 3) of the contents of the control by the connection management server of the conventional information processing system.
Figure 3:
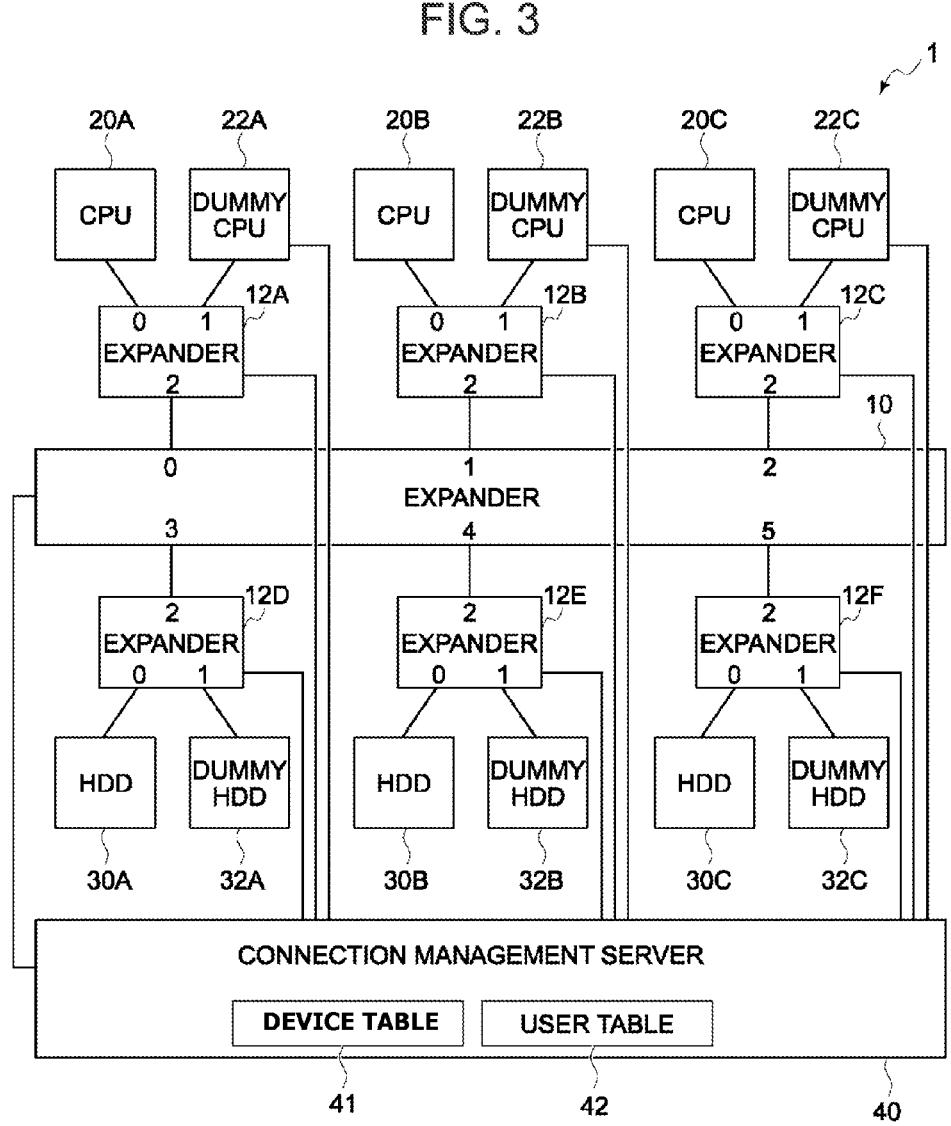
FIG. 3 is a diagram of a configuration of an information processing system according to a first embodiment.

As illustrated in FIG. 3, the information processing system 1 according to the first embodiment includes N number (N=3 in FIG. 3) of CPUs 20 (20A-20C) and N number of dummy CPUs 22 (22A-22C). The information processing system 1 further includes M number (M=3 in FIG. 3) of HDDs 30 (30A-30C), M number of dummy HDDs 32 (32A-32C), an expander 10, (N+M) number of expanders 12 (12A-12F), and a connection management server 40 as well. Note that the present information processing system 1 is a system developed on the assumption that the CPUs 20 are used together with some number of HDDs 30 via a network by specified users (individuals, enterprises, etc.). Accordingly, the information processing system 1 includes interface circuits etc. (unillustrated) for connecting the respective CPUs 20 within the system to the network.

The expander 10 is an expander (switch) including (N+M) number of SAS (Serial Attached SCSI (Small Computer System Interface)) ports (which will hereinafter be simply termed the ports). This expander 10 has a function of establishing connections between the ports to each of which the same zone ID is allocated. Each of the expanders 12 is, similarly to the expander 10, an expander for establishing the connections between the ports to each of which the same zone ID is allocated. Each of the expanders 12 includes three SAS ports.

Each of the expanders 10 and 12 includes a communication interface (unillustrated) for accepting a setting instruction of the zone ID and the like. Moreover, each of the expanders 10 and 12 is connected via the communication interface to the connection management server 40.

Each of the ports of the expander 10 is connected to one port of each of the expanders 12 different from each other. The CPU 20X and the dummy CPU 22X (X=A–C) are respectively connected to remaining two ports (to which the expander 10 is not connected) of the expanders 12X. Moreover, the HDD 30A and the dummy HDD 32A are connected to the remaining two ports of the expander 12D, and the HDD 30B and the dummy HDD 32B are connected to the remaining two ports of the expander 12E. Further, the HDD 30C and the dummy HDD 32C are connected to the remaining two ports of the expander 12F. Note that numerical values given in the vicinities of the respective ports of the expanders 10 and 12 in FIG. 3 represent port IDs of the ports.

Each of the dummy HDDs 32 in the information processing system 1 is a device having a function of transmitting, when receiving a predetermined ID request, its own device ID to a sender device of the ID request. On the occasion of configuring (manufacturing) the information processing system 1, the device having only the function described above (i.e., the device that can be manufactured at a low cost because of having only the function described above) is used as each dummy HDD 32.

Each dummy CPU 22 is a SAS device including a communication interface for performing communications with the connection management server 40 and having an ID readout function. Herein, the ID readout function connotes a function of acquiring, when receiving the ID readout request for reading the ID from a certain dummy HDD 32 from the connection management server 40, the device ID from this dummy HDD 32 by transmitting the ID request and sending the device ID back to the connection management server 40. Note that the ID readout function held by each dummy CPU 22 is a function of sending, if failing to read the ID (if unable to acquire a response to the ID request within a predetermined period of time), information indicating this purport (which will hereinafter be referred to as ID acquisition failure notification) back to the connection management server 40. Further, on the occasion of configuring (manufacturing) the information processing system 1, similarly to the dummy HDD 32, as the dummy CPU 22, the device that has only the ID readout function is usually used.

The connection management server 40 is basically an apparatus which controls the expanders 10 and 12 so as to attain a desired connecting relation between the CPU 20 and the HDD 30 within the information processing system 1. This connection management server 40 has a function (its details will be described later on) of checking, before actually connecting two devices, whether the two devices are valid or not by controlling the dummy CPU 22 etc.

The configuration and operations of the information processing system 1 will hereinafter be described more specifically based on the premise of what has been discussed so far.

The connection management server 40 in the information processing system 1 is an apparatus configured by storing an OS (Operating System), a validation connecting program, configuration data, etc. into the HDD (Hard Disk Drive) of a computer equipped with a display, a keyboard, and so on.

The configuration data stored on the HDD of the connection management server 40 is data (the details will be described later on) representing the number and the types of the devices (the CPUs 20, the HDDs 30, the expanders 12, etc.) and the connecting relations between the devices within the information processing system 1.

The validation connecting program is a program for getting the computer installed with the program itself to operate as the connection management server 40. The CPU (Central Processing Unit) of the connection management server 40, which executes this validation connecting program, operates as follows.

The CPU starting the execution of the validation connecting program, at first, reads the configuration data out of the HDD and prepares a device table 41 having contents corresponding to the readout configuration data on a main memory (which will hereinafter be simply termed the memory).

FIG. 4 illustrates an example of the device table 41 prepared on the memory by the CPU immediately after starting the execution of the validation connecting program.

As illustrated in FIG. 4, the device table 41 contains a device ID (DEVICE ID) field, an expander ID (EXP ID) field, a port ID (PORT ID) field, and zone information (ZONE) field.

The expander ID field is a field in which a device ID of the expander 10 or 12 within the information processing system 1 is set as an expander ID. The port ID field is a field in which to set a port ID of one port of the expander identified by the associated expander ID (which is set in the same record). The device ID field is a field in which to set a device ID of the device (the CPU 20, the dummy CPU 22, etc.) connected to the port, identified by the associated port ID, of the expander identified by the associated expander ID. Note that throughout the respective drawings and FIG. 4 inclusive that are related to the device table 41, "EXP-M" represents the device ID of the expander 10, and "EXP-Y" (Y=A–F) represents the device ID of the expander 12Y. "CPU-X" (X=A–C) indicates the device ID of the CPU 20X, and "HDD-X" indicates the device ID of the HDD 30X. Similarly, "DUMMY CPU-X" (X=A–C) denotes the device ID of the dummy CPU 22X, and "DUMMY HDD-X" represents the device ID of the dummy HDD 32X.

The zone information field is a field in which "NULL" is set in this field if the zone ID is not allocated to the port, identified by the associated port ID, of the expander identified by the associated by the expander ID, while the zone ID is set therein whereas if the zone ID is allocated to this port.

The configuration data on the HDD is data representing the contents in the fields other than the zone information field in this device table 41. To be more specific, the configuration data is the data including information sets each containing the port ID of a port, the expander ID of the expander 10 or 12 including the port, and the device ID of the device connected to the port on a port-by-port basis in the information processing system 1.

The CPU starting the execution of the validation connecting program prepares the device table 41 by storing each information set in the configuration data such as this together with the zone information "NULL" on the memory.

Further, the CPU also prepares a user table 42 on the memory.

FIG. 5 depicts contents of the user table 42 prepared on the memory by the CPU. As depicted in FIG. 5, the user table 42 contains a user ID field and a zone ID (ZONE) field.

The user ID field is a field in which to set a user ID of a user enabled to use some number of devices (one or more CPUs 20 and one or more HDDs 30). The zone ID field is a field in which to set a zone ID allocated to the user having the associated user ID (set in the same record). As schematically illustrated in FIG. 5, the user table 42 prepared on the memory by the CPU immediately after starting the execution of the validation connecting program is an empty table, that is, a table in which any significant items of information are not set.

Upon completing the preparations of the device table 41 and the user table 42 having the contents as illustrated in FIGS. 4 and 5, the CPU comes to a status of monitoring (standing by for) an input of a connecting instruction by an operator.

The connecting instruction, of which the input is monitored by the CPU, is classified into a connecting instruction related to a new user and a connecting instruction related to an existing user.

Herein, the new user implies a user not enabled to use any one of the CPU 20 and the HDD 30 so far. Further, the connecting instruction related to the new user is an instruction inputted by the operator when the new user gets enabled to use a certain CPU 20 and a certain HDD. When inputting this connecting instruction, the operator specifies the user ID of the new user and the device IDs of the two devices (the CPU 20 and the HDD 30 used by the new user) that should be connected.

Moreover, the existing user is a user already enabled to use at least one of the CPUs 20 and one of the HDDs 30. Further, the connecting instruction related to the existing user connotes an instruction inputted by the operator if increasing the number of the HDDs 30 which a certain existing user is enabled to use. When inputting this connecting instruction, the operator specifies the user ID of the existing user and the device ID of the HDD 30 that is newly used by the existing user.

Note that when giving the connecting instruction, the user ID of the new user is specified normally by inputting the user ID prepared as the ID for the new user through the keyboard. Further, when giving the connecting instruction, the respective items of information (the user ID of the existing user, the device ID of the device) are specified normally by selecting "User/Device" from "User/Device List" displayed on the display.

The CPU, when receiving the input of the connecting instruction related to the new user, starts a validation connecting process for the new user in a procedure illustrated in FIG. 6. Further, the CPU, when receiving the input of the connecting instruction related to the existing user, starts a validation connecting process for the existing user in a procedure illustrated in FIG. 7.

To begin with, contents of the validation connecting process for the new user (FIG. 6) are explained. Note that in the following explanation of the validation connecting process for the new user, connection target devices (devices are one CPU and one HDD) are the devices specified by the operator to enable a certain user to use these devices. Further, a focused user is defined as the new user determined to use the connection target devices. Moreover, associated dummy devices (the associated dummy CPU, the associated dummy HDD) connote the dummy devices (the dummy CPU 22, the dummy HDD 32) connected to the same expander 12 as the expander to which the connection target devices are connected.

As illustrated in FIG. 6, the CPU starting this validation connecting process for the new user, at first, determines a unique zone ID for the focused user, and adds a record containing the determined zone ID and the user ID of the focused user to the user table 42 (step S11). Herein, the unique zone ID connotes a zone ID different from every other zone ID already stored in the user table 42.

Subsequently, the CPU specifies each port located on a communication path between the associated dummy CPU and the associated dummy HDD by referring to the device table 41 (step S12). It is to be noted that "specifying a certain port" implies "collecting the information indicating a certain port (the combination of the port ID of a certain port and the expander ID of the expander including this port) from the device table 41" in the first embodiment.

Thereafter, the CPU allocates the zone ID (which will hereinafter be referred to as the zone ID for the user) determined in the process of step S11 to each of the specified ports (step S13). That is, the CPU executes a process of changing settings of the expander 12 connected to the associated dummy CPU, the expander 12 connected to the associated dummy HDD, and the expander 10 in this step S13.

In subsequent step S14, the CPU changes the zone information on each port to which the zone ID for the user is allocated in the device table 41 into the zone ID for the user.

The CPU finishing the process of step S14 instructs the associated dummy CPU to acquire the device ID from the associated dummy HDD and send back this device ID (step S15).

Concretely, in this step S15, the CPU transmits the readout request for reading the ID from the associated dummy HDD to the associated dummy CPU.

As already described, each dummy HDD 32 has the function of transmitting, when receiving a predetermined ID request, its own device ID to a sender device of the ID request. Further, each dummy CPU 22 has the ID readout function of acquiring, when receiving the ID readout request for reading the ID from a certain dummy HDD 32 from the connection management server 40. Further, the ID readout function held by each dummy CPU 22 is a function of sending, if failing to read out the device ID, ID acquisition failure notification indicating this purport back to the connection management server 40.

Accordingly, when the CPU transmits the readout request for reading the ID out of the associated dummy HDD to a certain dummy CPU 22, a piece of response information (the device ID of a certain dummy HDD 32 or the ID acquisition failure notification) in response to this readout request is transmitted from the dummy CPU 22.

The CPU finishing the transmission of the readout request stands by for receiving the response information. Then, the CPU finishes the process of step S15 when receiving the response information.

The CPU finishing the process of step S15 determines whether the received response information is the device ID of the associated dummy HDD or not (step S16). When the received response information is not the device ID of the associated dummy HDD (step S16; NO), the CPU stops the validation connecting process for the new user. Then, the CPU executes an error message display process defined as a process of displaying a message purporting that some error occurs on the display of the connection management server 40.

On the other hands, when the response information is the device ID of the associated dummy HDD (step S16;YES), the CPU allocates the zone ID for the user to the port of the expander 12 to which each connection target device is connected (step S17).

Subsequently, the CPU cancels allocating the zone for the user to each associated dummy device port (each port of the expander 12 to which one of the associated dummy devices is connected) (step S18).

Then, the CPU updates the zone information in the device table 41 with respect to the ports with the settings being changed in the processes of steps S17 and S18 (step S19). Namely, in step S19, the CPU rewrites, into the zone ID for the user, the zone information on each of the port to which the connection target CPU is connected and the port to which the connection target HDD is connected. Moreover, in step S19, the CPU rewrites, into "NULL," the zone information on each of the port to which the associated dummy CPU is connected and the port to which the associated dummy HDD is connected.

The CPU finishing the process of step S19 terminates the validation connecting process for a new user and returns to the status of monitoring (standing by for) the input of the connecting instruction from the operator.

Herein, the contents of the connection validating process for a new user will be described more concretely by exemplifying a case where a new user is enabled to use the CPU 20A and the HDD 30B under such a condition that the user table 42 has the contents illustrated in FIG. 5.

In this case, in step S11, the user table 42 being "NULL" so far (FIG. 5) is changed into the table having the content as depicted in FIG. 8 (i.e., the table retaining one record).

Subsequently, the CPU starts a process of step S12. When in this process, the CPU, to start with, grasps based on the information in the device table 41 that the associated dummy CPU (the dummy CPU 22 connected to the same expander 12 to which the CPU 20A serving as the connection target CPU is connected) is the dummy CPU 22A. To be specific, the CPU grasps from the first record in the device table 41 (FIG. 4), i.e., the record in the second row of the device table 41, that the expander to which the CPU 20A (the device whose device ID is CPU-A) is connected is the expander 12A (the expander whose expander ID is EXP-A). Thereafter, the CPU grasps from the second record in the device table 41 that the dummy CPU connected to the expander 12A, i.e., the associated dummy CPU, is the dummy CPU 22A (the device whose device ID is DUMMY CPU-A).

Further, the CPU grasps based on the information in the device table 41 that the associated dummy HDD (the dummy HDD 32 connected to the same expander 12 to which the HDD 30B serving as the connection target HDD is connected) is the dummy HDD 32B.

The CPU grasping that the associated dummy CPU is the dummy CPU 22A and that the associated dummy HDD is the dummy HDD 32B, specifies each port located on the communication path therebetween on the basis of the information in the device table 41. The CPU specifies the ports on the communication path between the associated dummy CPU and the associated dummy HDD in a way that classifies these ports into the ports on the side of the associated dummy CPU and the ports on the side of the associated dummy HDD.

Namely, the CPU specifies the following ports as the ports on the side of the associated dummy CPU (the dummy CPU 22A). Note that a port n represents the port of which the port ID is n in the following description.

Port 1 of the expander 12A to which the dummy CPU 22A is connected;
Port 2 of the expander 12A to which the expander 10 (the expander whose device/expander ID is EXP-M) is connected; and
Port 0 of the expander 10 to which the expander 12A is connected.

Furthermore, the CPU specifies the following ports as the ports on the side of the associated dummy HDD (the dummy HDD 32B):

Port 1 of the expander 12E (the expander whose expander ID is EXP-E) to which the dummy HDD 32B is connected;
Port 2 of the expander 12E to which the expander 10 is connected; and
Port 4 of the expander 10 to which the expander 12E is connected.

The CPU, which specifies each of the ports located on the communication path between the associated dummy devices in the procedure described above (step S12), allocates the zone ID for the user to each specified port (step S13). Moreover, the CPU changes the zone information on each port to which the zone ID for the user is allocated in the device table 41 into the zone ID for the user (step S14).

As already described, each of the expanders 10 and 12 is the device (switch) for establishing the connection between the ports to which the same zone IDs are allocated. Accordingly, in the case discussed herein, upon completing the processes up to step S13, it follows that such a status occurs as to be schematically illustrated in FIG. 9, i.e., such a status occurs as to enable the communications between the dummy CPU 22A and the dummy HDD 32B. Further, through a process in subsequent step S14, it follows that the contents of the device table 41 are changed into those depicted in FIG. 10.

Thereafter, the CPU transmits the readout request for reading the ID from the associated dummy HDD to the associated dummy CPU, and stands by for receiving the response information to the readout request (step S15). Then, the CPU, when the received response information is the device ID of the associated dummy HDD (step S16; YES), allocates the zone ID for the user to the port of the expander 12 to which each connection target device is connected (step S17).

Figure 11:
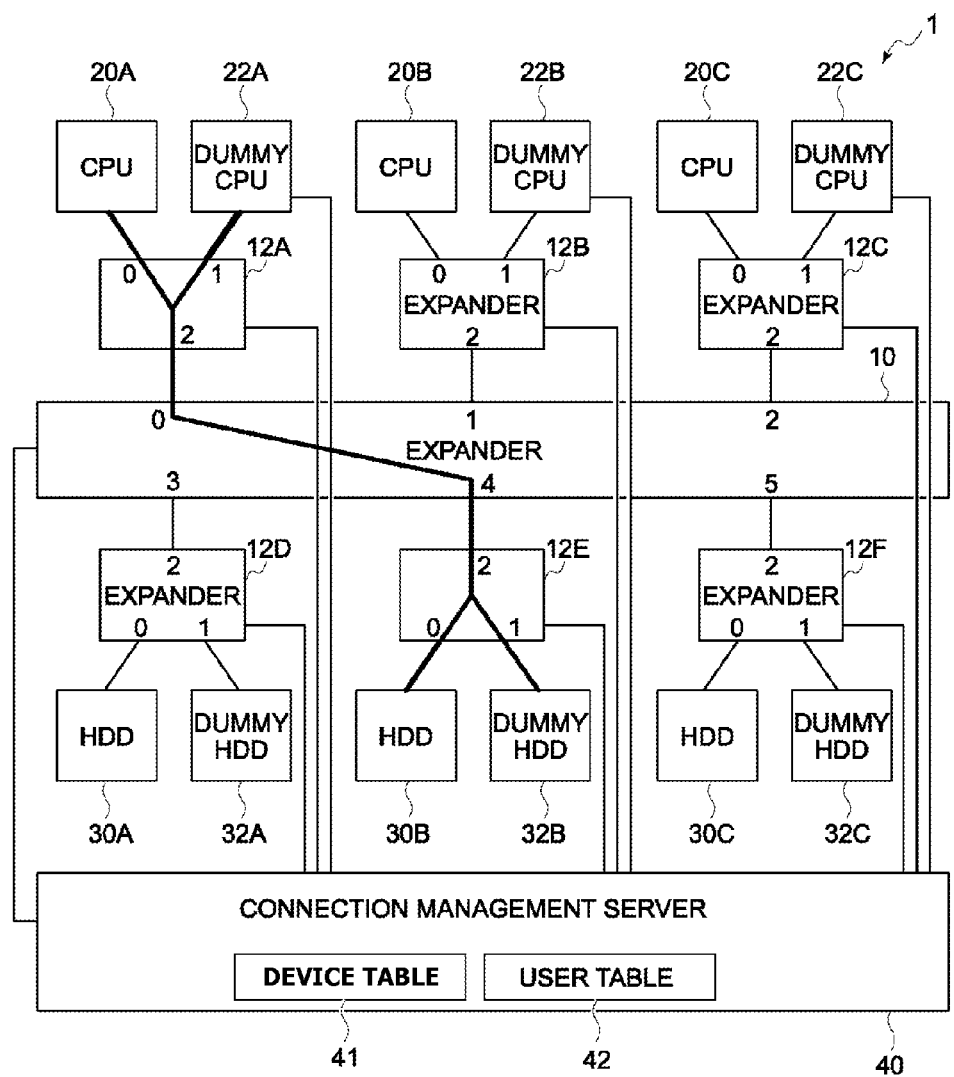
FIG. 11 is an explanatory diagram of an example of the status of the information processing system 1 during the validation connecting process for a new user.

The zone ID for the user has already been allocated to each port existing on the communication path between the associated dummy CPU and the associated dummy HDD in the process of step S13. Then, the connection target device is connected to the expander 12 to which the associated dummy device is connected. Accordingly, when the processes up to step S17 are completed, it follows that such a status occurs as to be schematically illustrated in FIG. 11, i.e., such a status occurs as to enable the communications between the CPU 20A serving as the connection target CPU and the HDD 30B serving as the connection target HDD.

Figure 12:
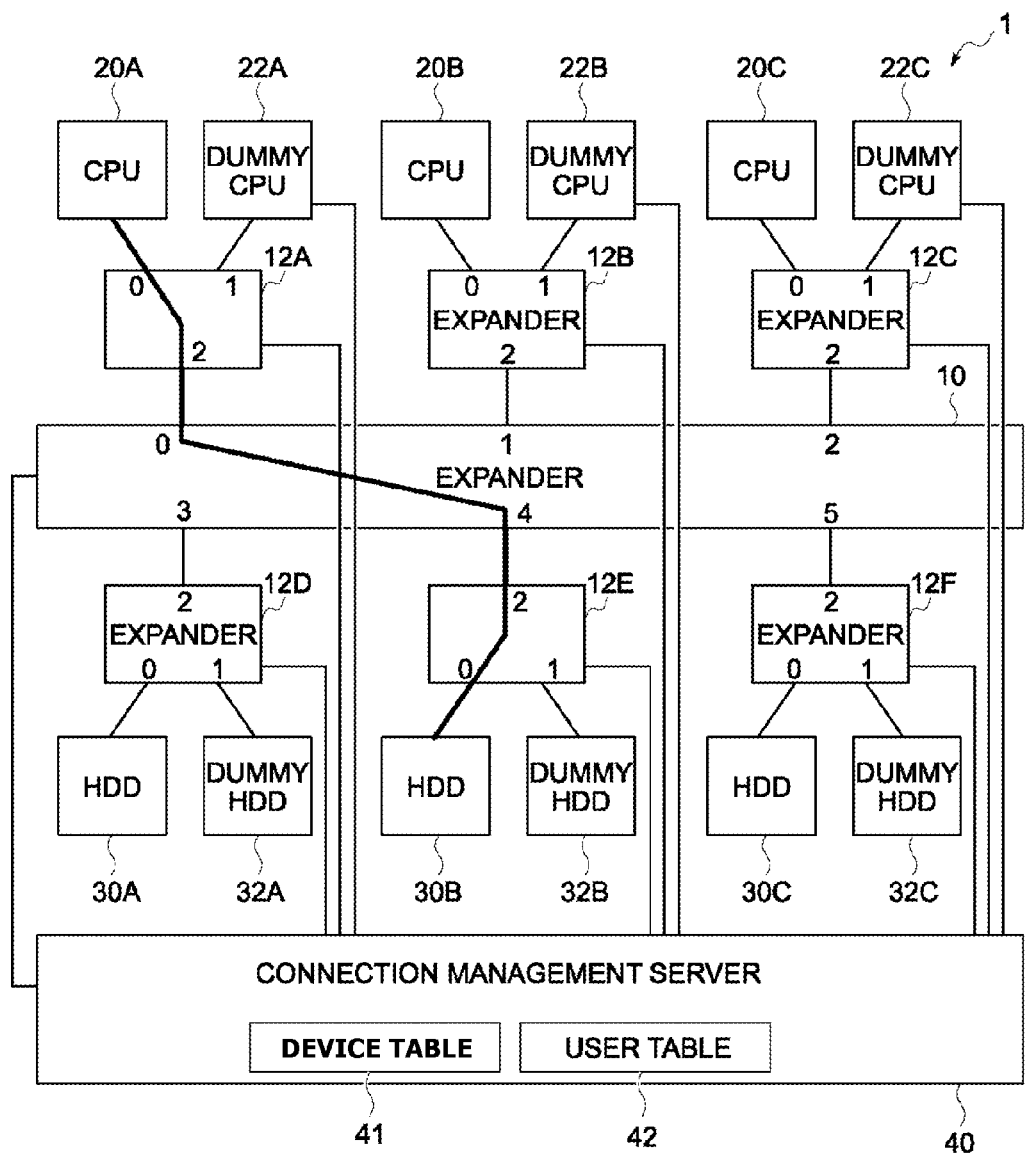
FIG. 12 is an explanatory diagram of an example of a status of the information processing system 1 when completing the validation connecting process for a new user.

The status occurring through the processes up to step S17 is, however, a status enabling the communications between the associated dummy devices. Moreover, the communications between the associated dummy devices are unnecessary any more, and hence the allocation of the zone for the user to each associated dummy device port is canceled (step S18). As a result, the status of the information processing system 1 becomes a status schematically illustrated in FIG. 12, i.e., a status enabling the communications between the CPU 20A and the HDD 32B but disabling the communications between the dummy CPU 22A and the dummy HDD 32B.

Then, the CPU finishing the process in step S18 (FIG. 6) updates the zone information on the respective ports with the settings being changed in the processes of steps S17 and S18 in the device table 41 (step S19). Accordingly, it follows that the device table 41 is changed into the table 41 having the contents illustrated in FIG. 13, i.e., the table 41 representing the status in FIG. 12.

Next, the contents of the validation connecting process for the existing user (FIG. 7) will be described. Note that in the description of the validation connecting process for the existing user, the connection target HDD represents the HDD 30 specified by the operator to enable the existing user to use this HDD, and the connection target CPU represents the CPU 20 already used by the existing user. The focused user connotes the existing user determined to use the connection target HDD. Further, the associated dummy devices (the associated dummy CPU and the associated dummy HDD) denote the dummy devices connected to the same expander 12 to which one of the connection target devices is connected.

As illustrated in FIG. 7, the CPU starting the validation connecting process for the existing user reads, at first, the zone ID (which will hereinafter be referred to as the zone ID for the user) associated with the user ID of the focused user out of the user table 42 (step S21).

Subsequently, the CPU specifies each of zone ID yet-unallocated ports located on the communication path between the associated dummy CPU and the associated dummy HDD by referring to the device table 41 (step S22). Note that the zone ID yet-unallocated port connotes the port to which the zone ID is not yet allocated (the port with "NULL" being set the zone information in the device table 41).

Thereafter, the CPU sets the zone ID for the user to each zone ID yet-unallocated port specified in the process of step S22 (step S23). Further, the CPU also executes a process of storing the zone ID for the user as the zone information on the specified zone ID yet-unallocated port in the device table 41 (step S24).

In step S25, the CPU finishing the process in step S24 executes the process having the same content as the process in step S15 has. Then, the CPU, when the received response information is not the device ID of the associated dummy HDD (step S26; NO), stops the validation connecting process for the existing user, and carries out the error message display process having the same content as already described.

On the other hands, when the received response information is the device ID of the associated dummy HDD (step S26; YES), the CPU allocates the zone ID for the user to the port of the expander 12 to which the connection target HDD is connected (step S27). Subsequently, the CPU cancels allocating the zone ID for the user to the port of the expander 12 to which the associated dummy HDD is connected (step S28).

Thereafter, the CPU changes the zone information on the connection target HDD etc. in the device table 41 into the information representing the status quo (step S29). Then, the CPU finishes the validation connecting process for an existing user and returns to the status of monitoring the input of the connecting instruction from the operator.

The contents of the validation connecting process for an existing user will be further concretely described by exemplifying a case of enabling the user with the user ID being "A" to use the HDD 30A under a condition where the tables 41 and 42 are the tables having the contents illustrated in FIGS. 10 and 8, respectively.

In this case, in step S21, "1" is read as the zone ID for the user from the user table 42 (FIG. 8).

Further, in step S22, the following four ports are specified as "the zone ID yet-unallocated ports on the communication path between the associated dummy CPU and the associated dummy HDD":

Port 1 of the expander 12A to which the dummy CPU 22A is connected;

Port 1 of the expander 12D (the expander whose expander ID is EXP-D) to which the dummy HDD 32A is connected;

Port 2 of the expander 12D to which the expander 10 is connected; and Port 3 of the expander 10 to which the expander 12D is connected.

In short, "1" has already been allocated as the zone ID to the port 2 of the expander 12A and to the port 0 of the expander 10 (see FIG. 10). The ports excluding these ports on the communication path between the associated dummy CPU and the associated dummy HDD are therefore specified as "the zone ID yet-unallocated ports on the communication path between the associated dummy CPU and the associated dummy HDD."

Figure 14:
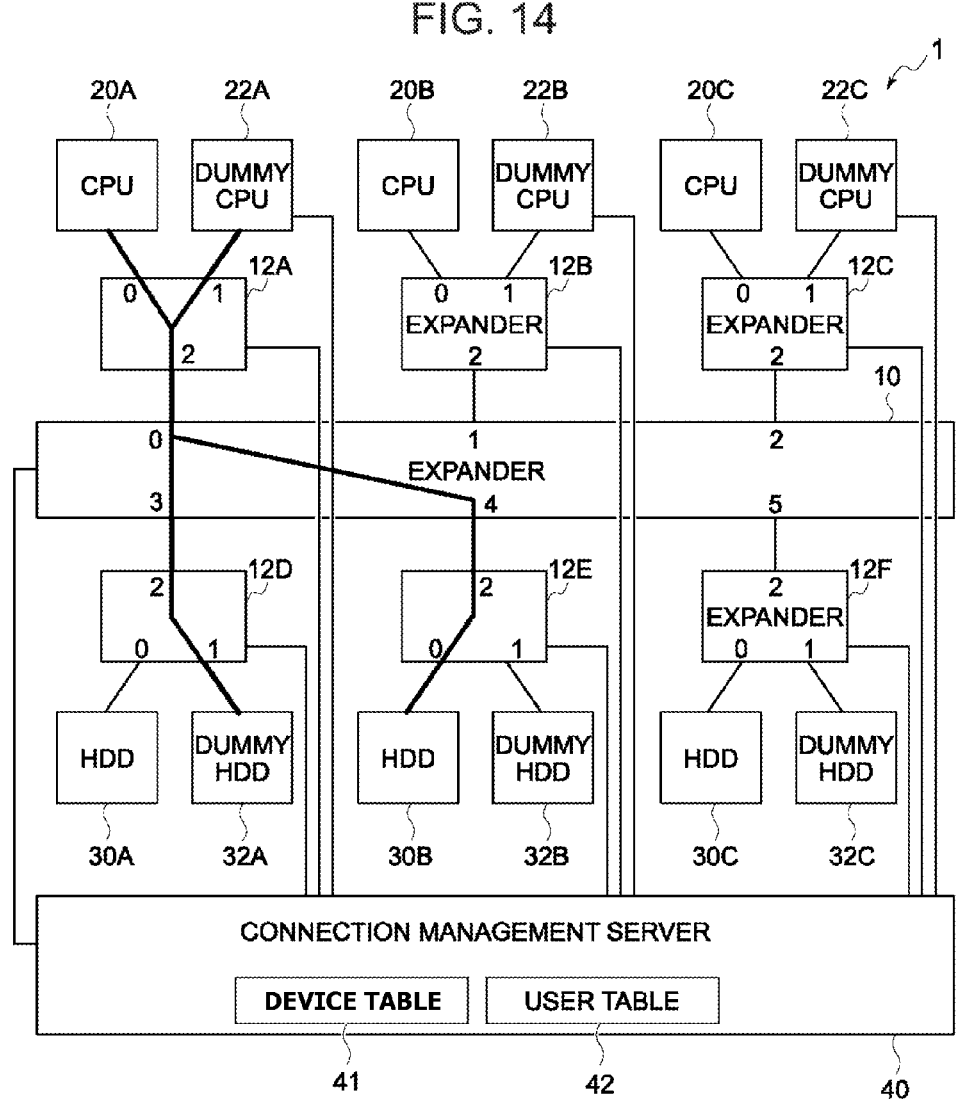
FIG. 14 is an explanatory diagram of an example of a status of the information processing system 1 during the validation connecting process for an existing user.

Thereafter, "1" is allocated as the zone ID for the user to each zone ID yet-unallocated port (step S23). Accordingly, the status of the information processing system 1 becomes, as schematically depicted in FIG. 14, the status in which the dummy CPU 22A and the dummy HDD 32A are connected thereto. Moreover, as a result of executing the process in step S24, the device table 41 becomes the table having the contents illustrated in FIG. 15.

The CPU finishing the processes up to step S24 transmits the readout request for reading the ID from the associated dummy HDD, and stands by for receiving the response information in response to the readout request (step S25). Then, the CPU, when the received response information is the device ID of the associated dummy HDD (step S26; YES), allocates the zone ID for the user to the port of the expander 12 to which the connection target HDD is connected (step S27).

The zone ID for the user has already been allocated in the process of step S13 to each of the ports existing on the communication path between the associated dummy CPU and the associated dummy HDD. Then, the connection target HDD is connected to the expander 12 to which the dummy HDD is connected. Hence, upon completing the processes up to step S27, it follows that there occurs the status enabling the communications between the CPU 20A as the connection target CPU and the HDD 30A as the connection target HDD.

Figure 16:
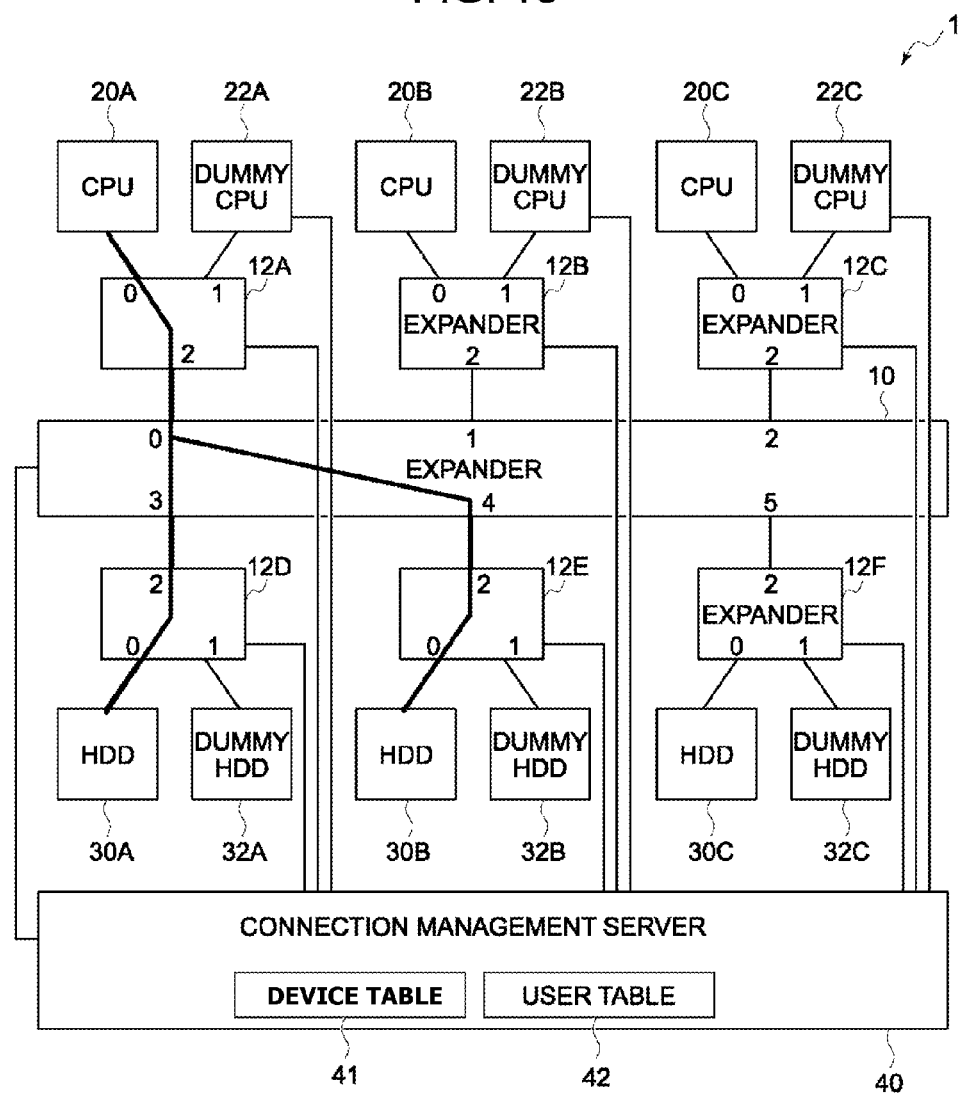
FIG. 16 is an explanatory diagram of an example of a status of the information processing system 1 when completing the validation connecting process for an existing user.

The status occurring through the processes up to step S27 is, however, also the status enabling the communications between the associated dummy devices. Moreover, the communications between the associated dummy devices are unnecessary any more. Hence the allocation of the zone for the user to each associated dummy device port is canceled (step S28). As a result, the status of the information processing system 1 becomes the status schematically illustrated in FIG. 16, i.e., the status enabling the communications between the CPU 22A and the HDD 32B and between the CPU 22A and the HDD 32A but disabling the communications between the dummy CPU 22A and the dummy HDD 32A.

The CPU finishing the process in step S28 (FIG. 7) updates the zone information on the respective ports with the settings being changed in the processes of steps S27, S28 in the device table 41 (step S29). Accordingly, it follows that the device table 41 is changed into the table 41 having the contents illustrated in FIG. 17, i.e., the table 41 representing the status in FIG. 16.

As described above in detail, the information processing system 1 is the system in which the expander 10 basically establishes the connection between the devices (the CPU 20, the HDD 30) which the user is enabled to use.

The expander 12, to which the dummy devices (the dummy CPU 22, the dummy HDD 32) associated with the respective devices are connected on the basis of the configuration data (the information in the device table 41), is, however, provided between each device and the expander 10. Then, each dummy HDD 32 has a function of transmitting, when receiving the predetermined ID request, its own device ID to the sender device of this ID request. Further, each dummy CPU 22 has a function of sending, when trying to acquire the ID of the dummy HDD 32 specified by the connection management server 40 by transmitting the ID request, the ID if this ID can be acquired but the ID acquisition failure notification whereas if the ID cannot be acquired back to the connection management server 40.

Further, the connection management server 40 has a function of establishing, based on the configuration data, the connection between the associated dummy devices, and establishing the connection between the connection target devices after confirming that the associated dummy CPU can acquire the device ID of the associated dummy HDD.

Moreover, occurrence of a phenomenon "the associated dummy CPU can acquire the device ID of the associated dummy HDD, and nevertheless the connection between the connection target devices is not established by the process in step S17 or S27" is confined to a case where a rather special error exists in the configuration data (and/or the way of establishing the connection between the devices).

Accordingly, the information processing system 1 can be said to be the system enabling the connection target HDD 30 to be connected substantially surely to the connection target CPU 20.

<<Second Embodiment>>

Figure 18:
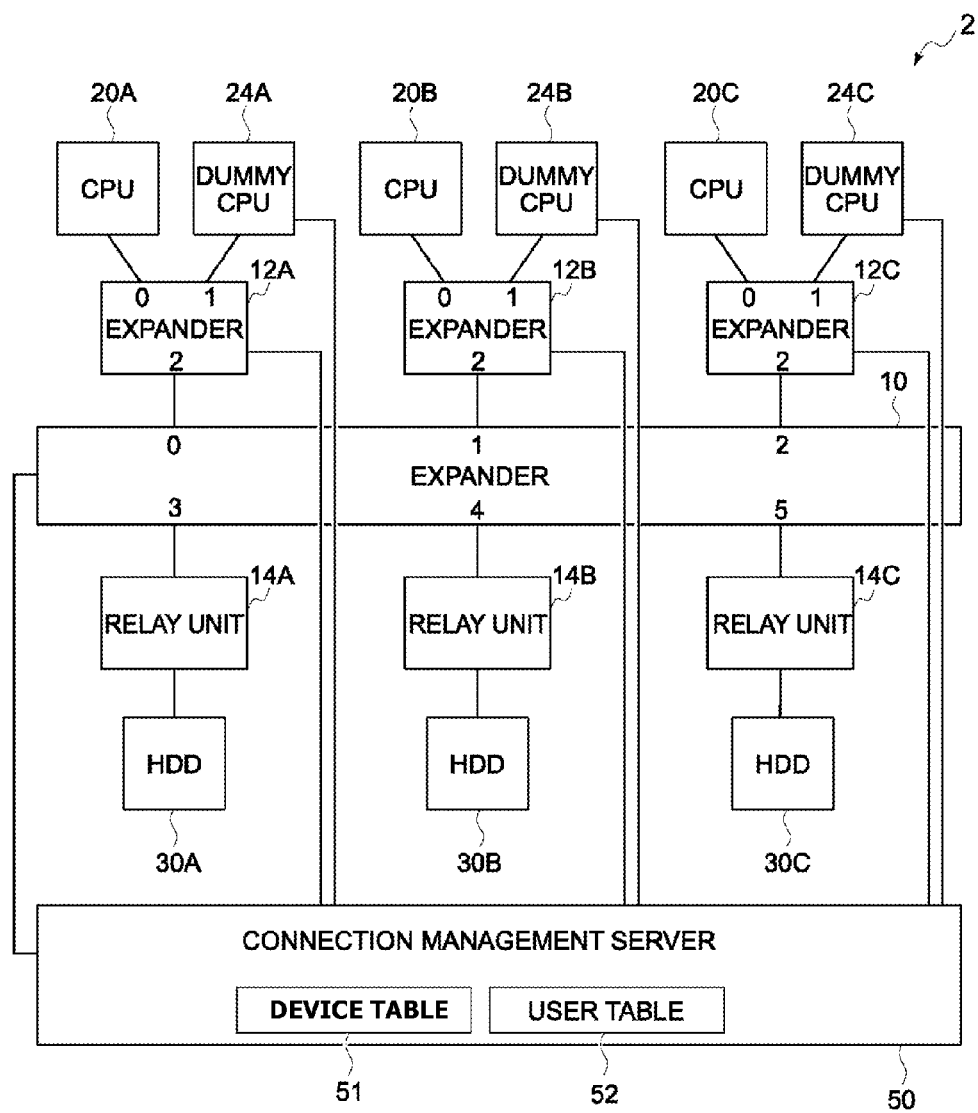
FIG. 18 is a diagram of a configuration of the information processing system according to a second embodiment.

FIG. 18 illustrates a configuration of an information processing system 2 according to a second embodiment. The configuration and the operations of the information processing system 2 according to the second embodiment will hereinafter be described by putting a focus on differences from those of the information processing system 1 according to the first embodiment discussed above.

As depicted in FIG. 18, the information processing system 2 includes N number (N=3 in FIG. 18) of CPUs 20 (20A-20C) and N number of dummy CPUs 24 (24A-24C). The information processing system 2 further includes M number (M=3 in FIG. 18) of HDDs 30 (30A-30C), M number of relay units 14 (14A-14C), the expander 10, N number of expanders 12 (12A-12C) and a connection management server 50 as well.

The expander 10, the expander 12, the CPU 20 and the HDD 30 in the information processing system 2 are respectively the same as the expander 10, the expander 12, the CPU 20 and the HDD 30 in the information processing system 1.

The relay unit 14X (X=A-C) is a unit basically for connecting the HDD 30X to the expander 10 (the unit for relaying the communications between the HDD 30X and the expander 10). The device ID of the HDD 30X connected to the unit 14X itself is previously set in the relay unit 14X. Then, the relay unit 14X, when receiving a predetermined ID request from the side of the expander 10, transmits the device ID set in the self-unit to the sender device of the ID request without relaying the ID request to the HDD 30X.

Each dummy CPU 24 is a device equipped with a communication interface for performing the communications with the connection management server 50 and having an ID readout function. Herein, the ID readout function is a function of acquiring, when receiving a readout request for reading the device ID out of a certain relay unit 14 from the connection management server 50, the device ID from the relay unit 14 by transmitting the ID request and sending the device ID back to the connection management server 50. Note that the ID readout function held by each dummy CPU 24 is a function of sending, if failing to read out the ID (if unable to obtain the response to the ID request within a predetermined period of time), the ID acquisition failure notification indicating this purport back to the connection management server 50.

The connection management server 50 is, similarly to the connection management server 40, an apparatus configured so that the HDD of the computer equipped with the display, the keyboard, etc. is stored with the OS, a second validation connecting program, second configuration data, etc.

The second configuration data stored on the HDD of the connection management server 50 is data (the details will be described later on) representing the number and the types of the devices (the CPUs 20, the HDDs 30, the expanders 12, etc.) and the connecting relations between the devices within the information processing system 2.

The second validation connecting program is a program for getting the computer installed with the program itself to operate as the connection management server 50. The CPU of the connection management server 50, which executes this second validation connecting program, operates as follows.

The CPU starting the execution of the second validation connecting program, at first, reads the second configuration data out of the HDD and prepares a device table 51 having contents corresponding to the readout configuration data on the memory.

FIG. 19 illustrates one example of the device table 51 prepared on the memory by the CPU immediately after starting the execution of the second validation connecting program.

As illustrated in FIG. 19, the device table 51 is a table having the same structure as the device table 41 has (see FIG. 4 etc.).

The second configuration data on the HDD is the data representing the contents in the fields other than the zone information field in this device table 51. To be more specific, the second configuration data is the data that includes, for each port in the information processing system 2, the port ID of the port; the expander ID of the expander 10 or 12 provided with the port; and the device IDs of the devices connected to the port directly or via the relay units 14.

The CPU prepares the device table 51 by storing each information set in the second configuration data such as this together with the zone information "NULL" on the memory.

Further, the CPU also prepares a user table 52 having the same structure and the same contents as those of the user table 42 (FIG. 5) on the memory.

Upon completing the preparations of the device table 51 and the user table 52 having the contents as described above, the CPU comes to a status of monitoring (standing by for) the input of the connecting instruction by the operator.

The connecting instruction, of which the input is monitored by the CPU in the connection management server 50, is the same as the connecting instruction, of which the input is monitored by the CPU in the connection management server 40.

Figure 20:
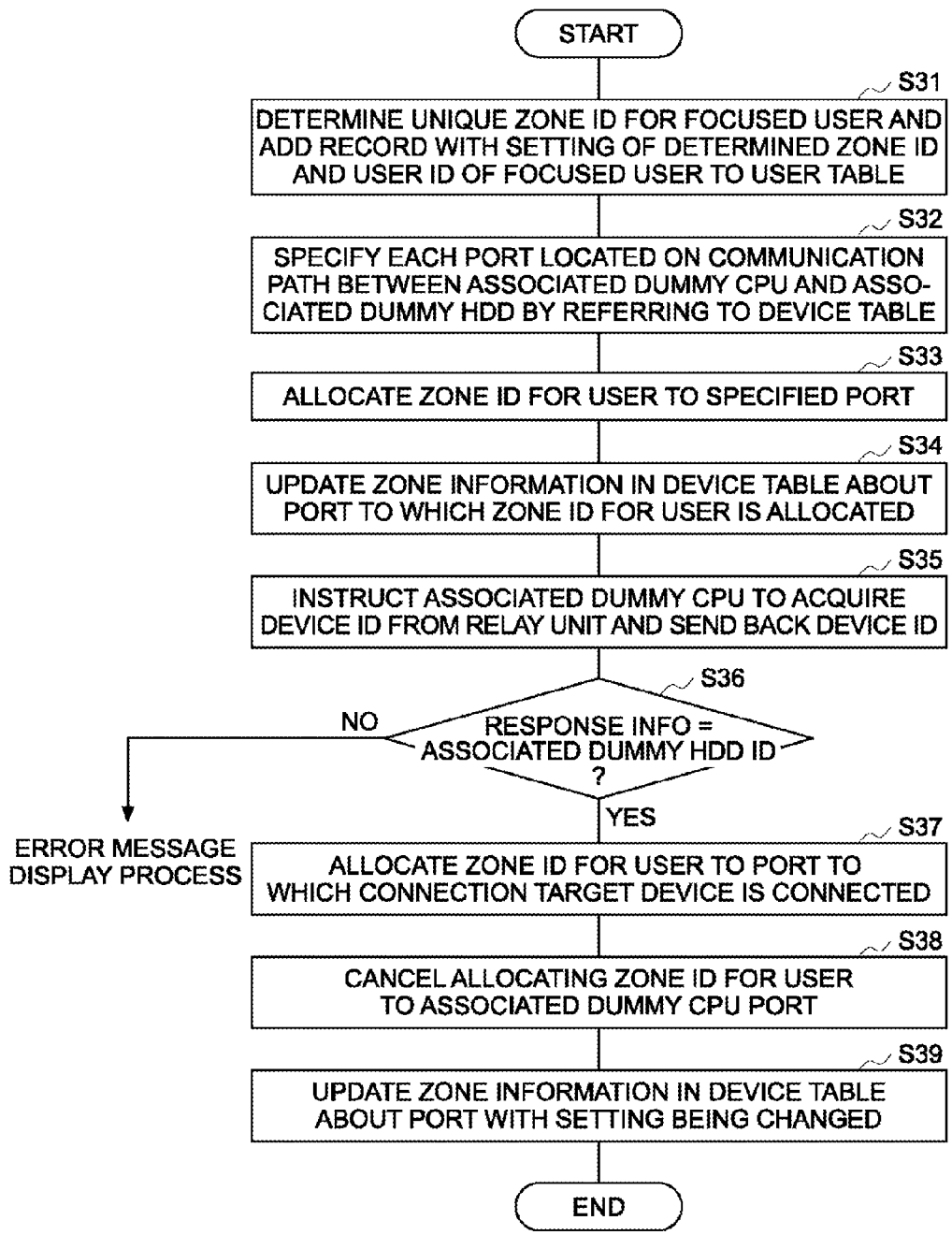
FIG. 20 is a flowchart illustrating of the validation connecting process for the new user, which is executed by the connection management server of the information processing system according to the second embodiment.

Then, the CPU, when the connecting instruction related to the new user is inputted, starts the validation connecting process for the new user in a procedure illustrated in FIG. 20. Note that in the following explanation, the connection target devices (devices are CPU and HDD) are the devices specified by the operator to enable a certain new user to use these devices, and the focused user is defined as the new user determined to use the connection target devices. Further, the associated dummy CPU represents the dummy CPU 24 connected to the same expander 12 to which the connection target CPU is connected.

As illustrated in FIG. 10, the CPU starting this validation connecting process for the new user, at first, determines a unique zone ID for the focused user, and adds a record containing the determined zone ID and the user ID of the focused user to the user table 52 (step S31).

Subsequently, the CPU specifies each port located on the communication path between the associated dummy CPU and the connection target HDD by referring to the device table 51 (step S32). Thereafter, the CPU allocates the zone ID for the user determined in the process of step S31 to each of the specified ports (step S33). That is, the CPU executes a process of changing settings of the expander 12 connected to the associated dummy CPU, the expander 12 connected to the associated dummy CPU and the expander 10 in this step S33.

In subsequent step S34, the CPU changes the zone information on each port to which the zone ID for the user is allocated in the device table into the zone ID for the user.

The CPU finishing the process in step S34 instructs the associated dummy CPU to acquire the device ID from the relay unit 14 for the connection target HDD and send back this device ID (step S35).

Concretely, in this step S35, the CPU transmits the readout request for reading the ID from the relay unit 14 for the connection target HDD to the associated dummy CPU.

As already described, each of the relay units 14X, when receiving the predetermined ID request from the side of the expander 10, transmits the device ID (the device ID of the HDD 30X) set in the self-unit to the sender device of the ID request without relaying the ID request to the side of the HDD 30X. Furthermore, each dummy CPU 24 has the ID readout function of acquiring, when receiving the readout request for reading the device ID out of a certain relay unit 14 from the connection management server 50, the device ID from the relay unit 14 by transmitting the ID request and sending the device ID back to the connection management server 50. Moreover, the ID readout function held by each dummy CPU 24 is the function of sending, if failing to read out the ID (if unable to obtain the response to the ID request within a predetermined period of time), the ID acquisition failure notification indicating this purport back to the connection management server 50.

Accordingly, when the CPU transmits the readout request for reading the ID out of the relay unit 14 for the connection target HDD to a certain dummy CPU 24, the response information (the device ID of a certain HDD 32 or the ID acquisition failure notification) to the request is transmitted from the dummy CPU 24.

The CPU finishing the transmission of the readout request stands by for receiving this response information. Then, the CPU finishes the process in step S35 when receiving the response information.

The CPU finishing the process in step S35 determines whether the received response information is the device ID of the connection target HDD or not (step S36). If the received response information is not the device ID of the connection target HDD (step S36; NO), the CPU stops the validation connecting process for the new user. Then, the CPU executes an error message display process of displaying the message purporting that some error occurs on the display of the connection management server 50.

Whereas if the response information is the device ID of the connection target HDD (step S36; YES), the CPU allocates the zone ID for the user to the port of the expander 12 to which the each connection target CPU is connected (step S37).

Subsequently, the CPU cancels allocating the zone for the user to the port of the expander 12, to which each associated dummy CPU is connected (step S38).

Then, the CPU updates the zone information in the device table 51 with respect to the ports with the settings being changed in the processes of steps S37 and S38 (step S39). Namely, in step S39, the CPU rewrites, into the zone ID for the user, the zone information on the port to which the connection target CPU is connected. Moreover, instep S39, the CPU rewrites, into "NULL," the zone information on the port to which the associated dummy CPU is connected.

The CPU finishing the process in step S39 terminates the validation connecting process for the new user and returns to the status of monitoring (standing by for) the input of the connecting instruction from the operator.

Next, the contents of the validation connecting process for an existing user, which is executed by the CPU of the connection management server 50, will be described by use of FIG. 21. Note that in the following discussion, the connection target HDD represents the HDD 30 specified by the operator to enable the existing user to use this HDD, and the focused user connotes the existing user determined to use the connection target HDD. Further, the connection target CPU indicates the CPU 20 already used by the focused user, and the associated dummy CPU indicates the dummy CPU 24 connected to the same expander 12 as the expander to which the connection target CPU is connected.

Figure 21:
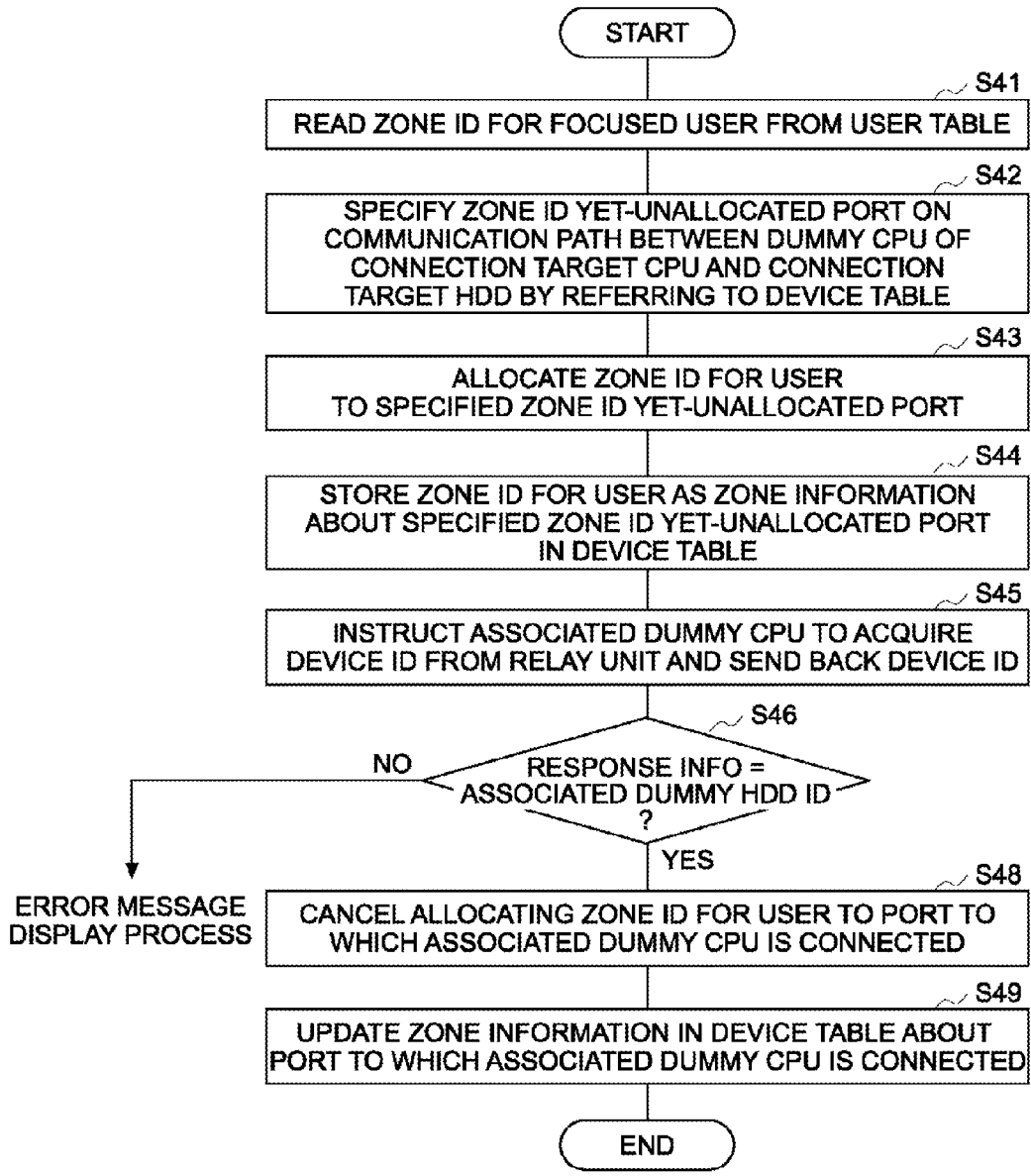
FIG. 21 is a flowchart illustrating of the validation connecting process for the existing user, which is executed by the connection management server of the information processing system according to the second embodiment.
Figure 22:
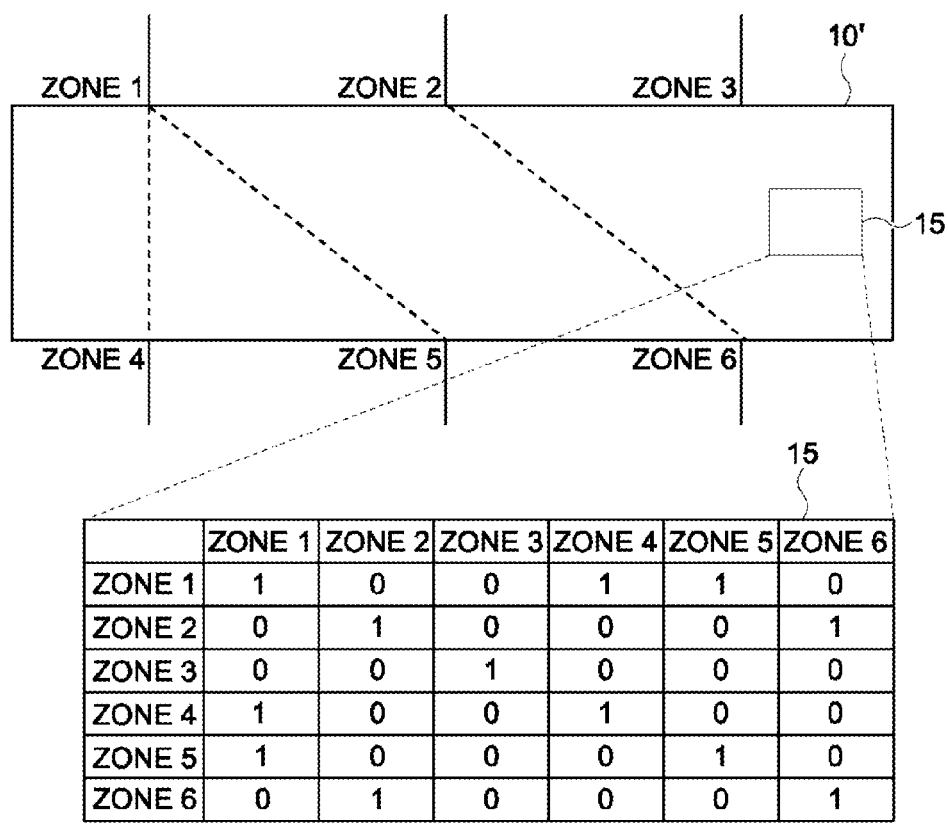
FIG. 22 is an explanatory diagram of an expander usable as a substitute for an expander in the information processing system according to the second embodiment.

As illustrated in FIG. 21, the CPU starting the validation connecting process for the existing user reads, at first, the zone ID (which will hereinafter be referred to as the zone ID for the user) associated with the user ID of the focused user out of the user table 52 (step S41).

Subsequently, the CPU specifies the respective zone ID yet-unallocated ports, to which the zone IDs are not yet allocated, located on the communication path between the associated dummy CPU and the connection target HDD by referring to the device table 51 (step S42).

Thereafter, the CPU executes a process of setting (allocating) the zone ID for the user to each zone ID yet-unallocated port specified in the process of step S42 (step S43). Further, the CPU also executes a process of storing the zone ID for the user as the zone information on the specified zone ID yet-unallocated port in the device table 51 (step S44).

In step S45, the CPU finishing the process in step S44 executes the process having the same content as the process in step S35 has. Then, the CPU, if the received response information is not the device ID of the connection target HDD (step S46; NO), stops the validation connecting process for the existing user, and carries out the error message display process having the same content as already described.

Whereas if the received response information is the device ID of the connection target HDD (step S46; YES), the CPU cancels allocating the zone ID for the user to the port of the expander 12 to which the associated dummy HDD is connected (step S48).

Thereafter, the CPU changes the zone information on the port to which the associated dummy CPU is connected in the device table 51 into the information representing the status quo (step S49). Then, the CPU finishes the validation connecting process for the existing user and returns to the status of monitoring the input of the connecting instruction from the operator.

As discussed above, the expander 12, to which the dummy CPU 24 associated with each CPU 20 in the second configuration data is connected, is provided between each of the CPUs 20 and the expander 10 in the information processing system 2. Moreover, the relay unit 14 capable of transmitting the device ID of each HDD 30 to the connection management server 50 via the dummy CPU 24, is provided between each of the HDDs 30 and the expander 10 in the information processing system 2.

Then, the connection management server 50 has the function of establishing the connection between the associated dummy CPU and the connection target HDD 30 and, after confirming that the associated dummy CPU can acquire the device ID of the connection target HDD 30 from the relay unit 14, establishes the connection between the connection target devices.

Moreover, occurrence of a phenomenon "the associated dummy CPU can acquire the device ID of the connection target HDD 30 from the relay unit 14, and nevertheless the connection between the connection target devices is not established by the process in step S37 or S47" is confined to a case where a rather special error exists in the second configuration data (and/or the way of establishing the connection between the devices).

Accordingly, the information processing system 2 can be also said to be the system enabling the connection target HDD 30 to be connected to the connection target CPU 20 substantially surely without exploiting the connection target CPU 20.

MODIFIED EXAMPLE

The information processing systems 1 and 2 according to the first and second embodiments discussed above can be modified in a variety of forms. For example, the respective relay units 14 can be also removed (each of the HDDs 30 is connected directly to the expander 10) from the information processing system 2 according to the second embodiment. In the information processing system 2 from which each relay unit 14 is removed, it follows that there is a case where the HDD 30 used by the user might be utilized, though only for reading out the device ID. On the other hand, according to the information processing system 2 including the relay units 14 and the information processing system 1 including the dummy HDDs 32, it is feasible to determine whether or not the valid connection can be established without exploiting the HDD 30 used by the user at all. It is therefore preferable to adopt the configurations of the embodiments discussed above.

The information processing systems 1 and 2 according to the first and second embodiments can be modified into systems in which the checking processes using the dummy CPUs 22 and 24 can be performed absolutely irrespective of the connections of the two connection target devices (the systems in which the checking processes using the dummy CPUs 22 and 24 can be performed when making an extension of, e.g., the HDDs 30).

The expanders 10 and 12 within the information processing systems 1 and 2 can be changed into expanders 10' as schematically illustrated in FIG. 21, i.e., the expanders 10' for establishing the connections between the ports on the basis of the zone IDs and accessibility matrices 15.

Further, as a matter of course, the expanders 10 and 12 within the information processing systems 1 and 2 may be changed into switches excluding the SAS expanders, and the information processing systems 1 and 2 may be modified into systems in which the connections between the CPUs 20 and storage devices (e.g., SSDs (Solid State Drives) other than the HDDs 30 are established and systems in which the connections among the CPUs 20, the HDDs 30 and the storage devices other than the HDDs 30 are established.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

What is claimed is:

1. An information processing system comprising:
   first through N-th (N≥2) central processing units (CPUs);
   first through N-th dummy CPUs associated respectively with the first through N-th CPUs;
   first through M-th (M≥2) storage devices;
   first through M-th dummy storage devices associated respectively with the first through M-th storage devices;
   a main switch including at least (N+M) number of ports;
   first through N-th dedicated CPU switches associated respectively with the first through N-th CPUs, each of the first through N-th dedicated CPU switches having a port group including at least three ports; and
   first through M-th dedicated storage device switches associated respectively with the first through M-th storage devices, each of the first through M-th dedicated storage device switches having a port group including at least three ports,
   wherein the port group of each dedicated CPU switch among the first through N-th dedicated CPU switches is connected to a CPU among the first through N-th CPUs which is associated with the each dedicated CPU switch, to a dummy CPU among the first through N-th dummy CPUs which is associated with the CPU, and to one port of the main switch,
   the port group of each dedicated storage device switch among the first through M-th dedicated storage device switches is connected to a storage device among the first through M-th storage devices which is associated with the each dedicated storage device switch, to a dummy storage device among the first through M-th dummy storage devices associated with the storage device, and to one port of the main switch,
   each of the first through M-th dummy devices is a device that sends, when receiving an identifying information request, its own identifying information back to a sender of the identifying information request, and
   each of the first through N-th dummy CPUs is a device that tries to, when receiving an instruction of acquiring identifying information from a dummy storage device among the first through M-th storage devices, acquire the identifying information of the dummy storage device by transmitting the identifying information request, and sends the identifying information as response information back to a sender device of the acquiring instruction.

2. The information processing system according to claim 1, further comprising a connection management apparatus to control connection relations between the ports of the first through N-th dedicated CPU switches and the first through M-th dedicated storage device switches,
   wherein the connection management apparatus, when instructed to establish the connection between a J-th (N≥J≥1) CPU and a K-th (M≥K≥1) storage device, transmits an instruction of acquiring identifying information from the K-th dummy storage device to the J-th dummy CPU after controlling one or more switches among the main switch, the J-th dedicated CPU switch and the K-th dedicated storage device so that the J-th dummy CPU is connected to the K-th dummy storage device, and controls the J-th dedicated CPU switch and/or the K-th dedicated storage device so that the J-th CPU is connected to the K-th storage device if the response information given from the J-th dummy CPU in response to the acquiring instruction is the identifying information of the K-th dummy storage device.

3. The information processing system according to claim 1, wherein each of the first through N-th dummy CPUs, when receiving the instruction of acquiring the identifying information from a certain dummy storage device, tries to the identifying information of the dummy storage device by transmitting the identifying information request, and sends, if the identifying information is acquired, the identifying information as response information back to the sender device of the acquiring instruction but sends, whereas if the identifying information is not be acquired, information indicating this purport as response information back to the sender device.

4. The information processing system according to claim 2, wherein the connection management apparatus, if the response information given from the J-th dummy CPU in response to the acquiring instruction is not the identifying information of the K-th dummy storage device, displays a message indicating this purport on a display.

5. An information processing system comprising:
first through N-th (N≥2) CPUs;
first through N-th dummy CPUs associated respectively with the first through N-th CPUs;
first through M-th (M≥2) storage devices;
a main switch including at least (N+M) number of ports; and
first through N-th dedicated CPU switches associated respectively with the first through N-th CPUs, each of the first through N-th dedicated CPU switches having a port group including at least three ports,
wherein the port group of each dedicated CPU switch among the first through N-th dedicated CPU switches is connected to a CPU among the first through N-th CPUs which is associated with the each dedicated storage switch, to a dummy CPU among the first through N-th dummy CPUs which is associated with the CPU, and to one port of the main switch,
the first through M-th storage devices are connected to ports, different from each other, of the main switch, to which the dedicated CPU switches are not connected, and
each of the first through N-th dummy CPUs is a device that, when receiving an instruction acquiring identifying information from a certain storage device among first through M-th storage devices, tries to acquire the identifying information of the storage device, and sends the identifying information as response information back to a sender device of the acquiring instruction if the identifying information can be acquired.

6. The information processing system according to claim 5, wherein a relay unit, which relays data between the each of the first through M-th storage device and the main switch and sends, when receiving an identifying information output instruction from a dummy CPU among the first through N-th dummy CPUs, storage device identifying information set therein back to the dummy CPU, is provided between each of the first through M-th storage device and the main switch.

* * * * *